(12) United States Patent
Fukai et al.

(10) Patent No.: US 7,690,800 B2
(45) Date of Patent: Apr. 6, 2010

(54) MIRROR ANGLE CONTROLLER

(75) Inventors: Akira Fukai, Shizuoka (JP); Hisaya Suzuki, Shizuoka (JP)

(73) Assignee: Murakami Corporation, Shizuoka-shi (JP)

( * ) Notice: Subject to any disclaimer, the term of this patent is extended or adjusted under 35 U.S.C. 154(b) by 87 days.

(21) Appl. No.: 11/664,501

(22) PCT Filed: Oct. 8, 2004

(86) PCT No.: PCT/JP2004/014947

§ 371 (c)(1),
(2), (4) Date: Apr. 3, 2007

(87) PCT Pub. No.: WO2006/040799

PCT Pub. Date: Apr. 20, 2006

(65) Prior Publication Data

US 2008/0043354 A1 Feb. 21, 2008

(51) Int. Cl.
*G02B 7/182* (2006.01)
*B60R 1/06* (2006.01)

(52) U.S. Cl. .................. 359/877; 359/873; 359/874; 359/876

(58) Field of Classification Search ........... 359/872, 359/873, 874, 876, 877
See application file for complete search history.

(56) References Cited

U.S. PATENT DOCUMENTS

| | | | | |
|---|---|---|---|---|
| 3,711,179 A | * | 1/1973 | Takeda | 359/508 |
| 4,116,538 A | * | 9/1978 | Oskam | 359/874 |
| 4,281,899 A | * | 8/1981 | Oskam | 359/876 |
| 4,506,954 A | * | 3/1985 | Enomoto | 359/874 |
| 4,693,571 A | * | 9/1987 | Kimura et al. | 359/874 |
| 4,696,555 A | * | 9/1987 | Enomoto | 359/874 |
| 4,701,037 A | * | 10/1987 | Bramer | 359/874 |
| 5,042,932 A | | 8/1991 | Pent | 359/874 |
| 5,226,034 A | * | 7/1993 | Nagayama et al. | 359/873 |
| 5,539,584 A | * | 7/1996 | Perry et al. | 359/874 |

(Continued)

FOREIGN PATENT DOCUMENTS

DE 39 14334 A1 10/1990

(Continued)

OTHER PUBLICATIONS

Supplementary European Search Report dated Oct. 15, 2007.

(Continued)

*Primary Examiner*—Ricky D Shafer
(74) *Attorney, Agent, or Firm*—Kratz, Quintos & Hanson, LLP

(57) ABSTRACT

A mirror angle controller is provided which includes a pivot plate (H) which is attached to a reverse side of a mirror (M), and an actuator (A) which holds the pivot plate (H), in which the actuator (A) includes a housing (A1), a rod (A3) which pushes and pulls the pivot plate (H), and a motor which provides driving force to the rod (A3), in which, a ringed holder (121) which is placed to surround the rod (A3) is formed in the housing (A1), and in which the pivot plate (H) includes a ringed sliding part (H31) which is contact with and arbitrarily slides on the holder (121), and an engaging part which is engaged with an end of the rod (A3) so as to securely hold the mirror (M).

6 Claims, 14 Drawing Sheets

U.S. PATENT DOCUMENTS 6,213,612 B1 * 4/2001 Schnell et al. .............. 359/877
6,899,439 B2 * 5/2005 Mendoza Vicioso ........ 359/877

FOREIGN PATENT DOCUMENTS

| | | |
|---|---|---|
| DE | 196 44824 C1 | 12/1997 |
| DE | 199 19 528 | 11/2000 |
| EP | 1 382 488 | 1/2004 |
| GB | 2 318 826 A | 5/1998 |
| JP | 56-21101 | 2/1981 |
| JP | 59-16245 | 1/1984 |
| JP | 63-44279 | 11/1988 |
| JP | 2004-515400 | 5/2004 |
| JP | 2004-161123 | 6/2004 |
| WO | WO 02/46001 | 6/2002 |

OTHER PUBLICATIONS

Chinese Office Action dated May 9, 2008 corresponding to Chinese Patent Application No. 2004800441795; and European Office Action dated Mar. 13, 2008 with English translation.

* cited by examiner

FIG.5
(a)
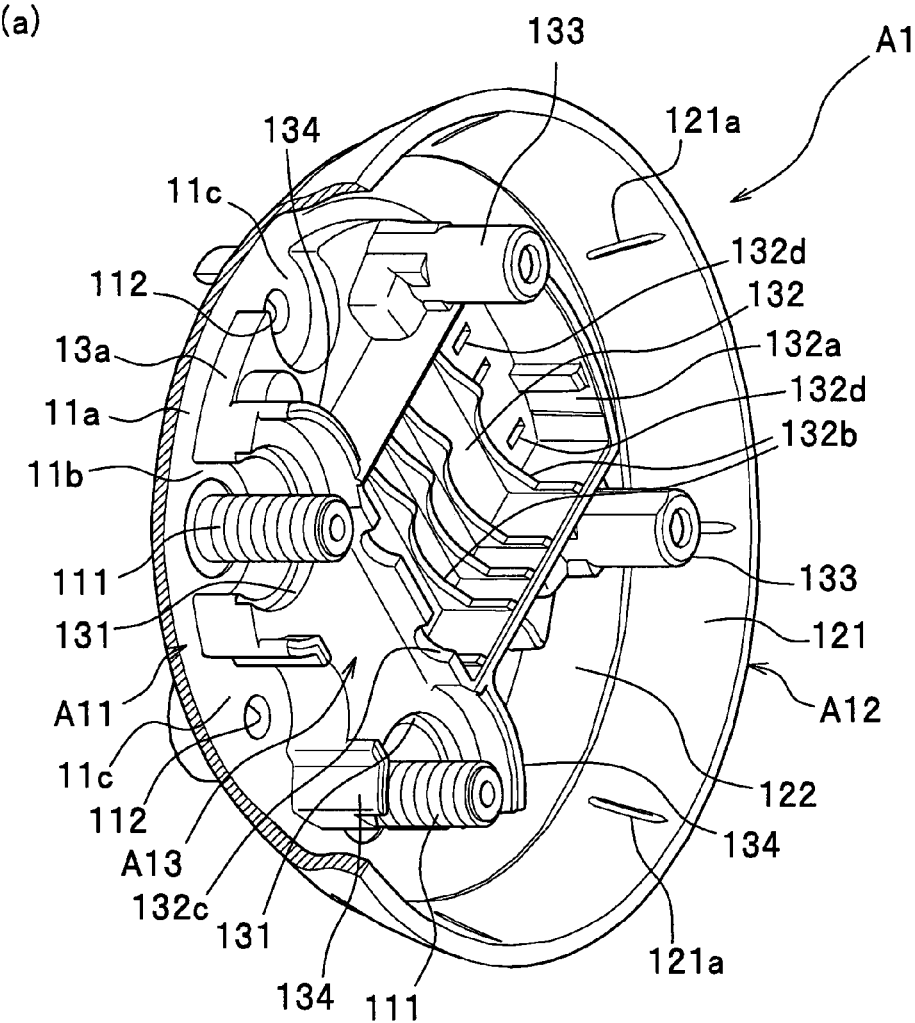
(b)
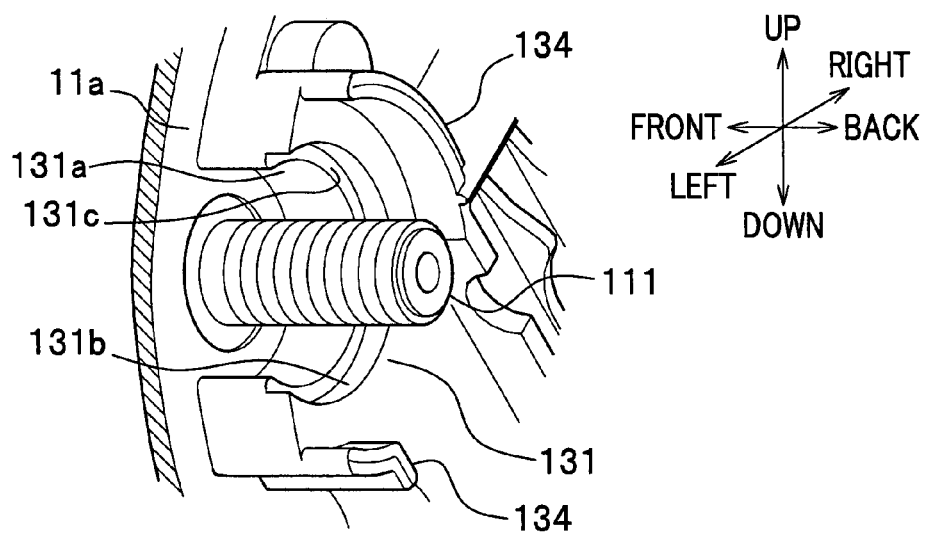

FIG.7
(a)
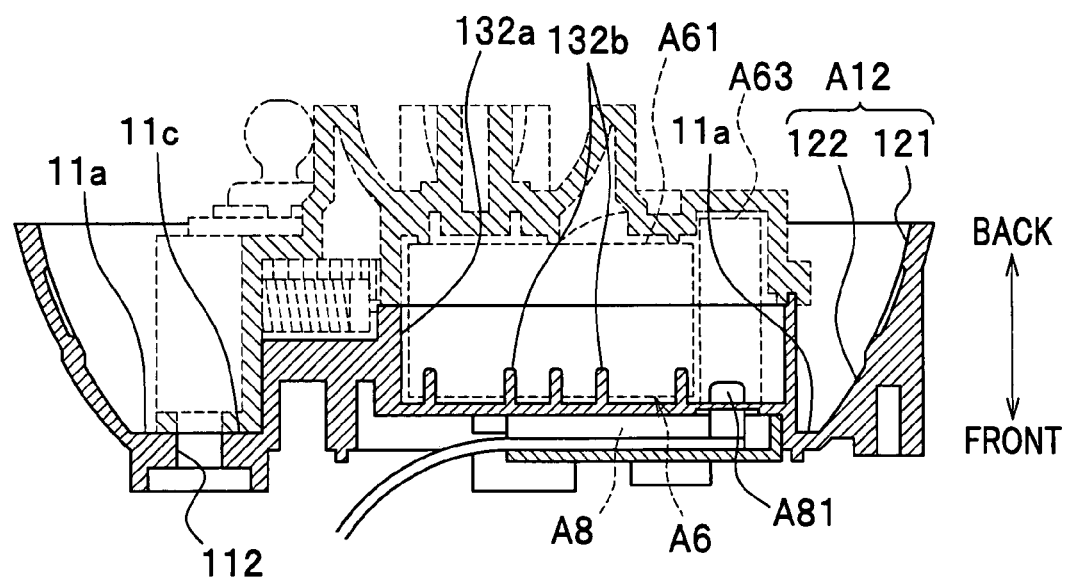
(b)
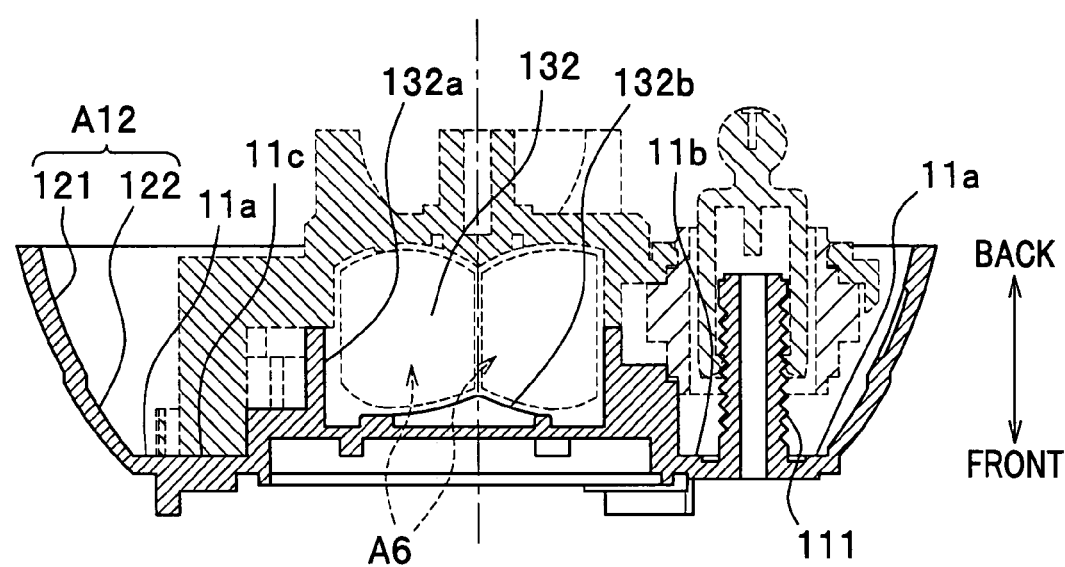

FIG.12
(a)
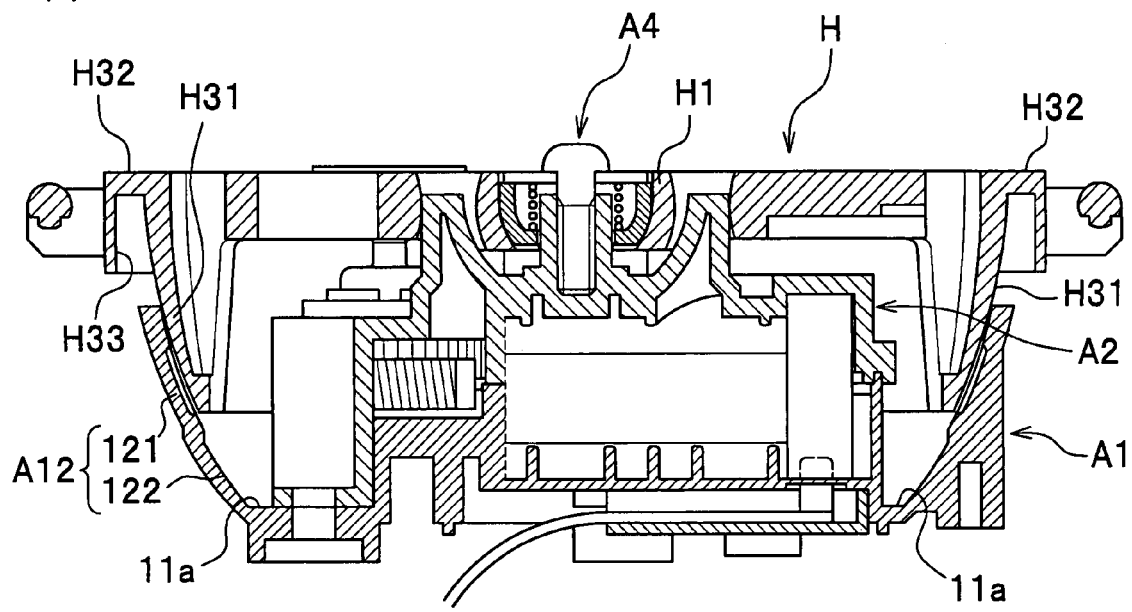
(b)
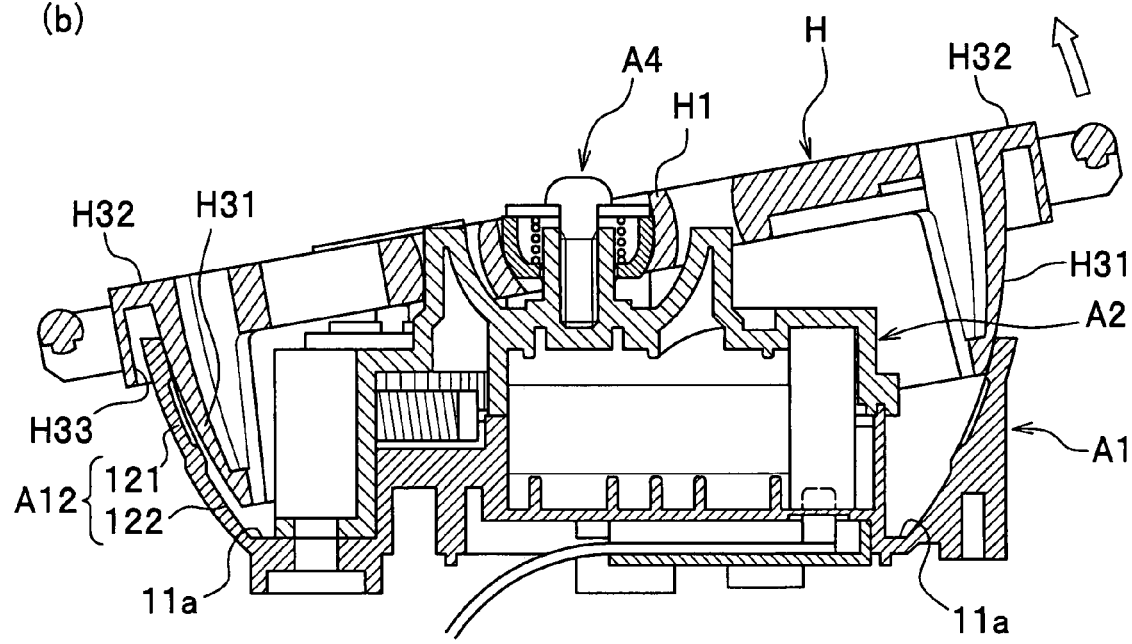

MIRROR ANGLE CONTROLLER

This application is a national stage application filed under 35 U.S.C. 371 of PCT/JP2004/014947 filed on Oct. 8, 2004.

TECHNICAL FIELD

The present invention relates to a mirror angle controller.

BACKGROUND ART

As described in JP 2004-161123A, for instance, a mirror angle controller which holds and arbitrarily tilts a mirror is included in an outer rear view mirror which is installed on a side of a vehicle.

As shown in FIG. 14, the mirror angle controller described in JP 2004-161123A is attached to a reverse side of a mirror M (on a front side of the vehicle). The mirror angle controller includes a pivot plate Hc which holds the mirror M through a mirror holder Mh, and an actuator Ac which holds and arbitrarily tilts the pivot plate Hc.

The actuator Ac includes a ringed holder P whose inner peripheral surface is spherically formed and rods Q and Q which push and pull the pivot plate Hc. Moreover, a motor which provides driving force to the rod Q, and a gear which transmits the driving force of the motor to the rod Q not shown are included inside the actuator Ac.

A ringed sliding part P' which is held by and arbitrarily slides on the holder P and a pair of engaging parts (not shown) with each of which the end of the rod Q engages are formed in the pivot plate Hc.

Thus, a rotation direction and amount of the motor are controlled to move the rod Q back and forth so that the pivot plate Hc tilts with respect to the actuator Ac.

By the way, in the mirror angle controller, the rods Q and Q are located outside the holder P. Therefore, load which is applied to the mirror M is applied to not only the holder P but also the rods Q and Q. In other words, in the mirror angle controller, the load which is applied to the pivot plate Hc is supported by three points (the holder P and the pair of rods Q and Q).

For instance, in a case where there is backlash between the rod Q in the actuator Ac and the engaging part in the pivot plate Hc, or a case where the rod Q has a dimension error or a mounting error, there occurs a problem that it is impossible to securely hold the mirror M. In particular, in a case where the mirror angle controller is installed in an outer mirror of a vehicle, the mirror M vibrates with high frequency during high-speed driving. A noise generated by the vibrating mirror may bother a passenger.

DISCLOSURE OF THE INVENTION

Problem to be Solved by the Invention

In view of the above, the inventors have carried on researches and developments to solve the above-described problems in the prior art and then devised the present invention. More specifically, it is an aspect of the present invention to provide a mirror angle controller which is able to securely hold a mirror.

Means for Solving Problem

To be concrete, in an aspect of the present invention, there is provided a mirror angle controller including a pivot plate which is attached to a reverse side of a mirror, and an actuator which holds the pivot plate. Moreover, the actuator includes a housing, a rod which pushes and pulls the pivot plate, and a motor which provides driving force to the rod. In the housing, a ringed holder which is placed to surround the rod is formed. The pivot plate includes a ringed sliding part which is contact with and arbitrarily slides on the holder, and an engaging part which is engaged with an end of the rod.

In other words, in the mirror angle controller as the aspect of the present invention, the rod of the actuator which pushes and pulls the pivot plate is placed inside the holder which supports the pivot plate. Thus, load which is applied to the mirror is mostly applied to the holder. Therefore, even in a case where the rod loosely engages with the engaging part in the pivot plate or a case where the rod itself has a dimension error or a mounting error, it is possible to securely hold the mirror. Moreover, the ringed sliding part which is formed in the pivot plate is contact with the ringed holder which is formed in the housing. Therefore, neither water nor dust enters between the ringed sliding part and the ringed holder. Therefore, it is possible to exclude or simplify watertight sealing around the rod which is placed inside the holder. Here, "ring" includes not only a perfect ring with no break, but also an imperfect ring which is discontinuous due to a slit or the like. Here, the pivot plate, which holds the mirror, is attached on the reverse side of the mirror directly or indirectly through the mirror holder or the like.

The housing may further include a stopper which prevents the pivot plate from turning in a circumferential direction of the holder. In addition, the stopper may be surrounded by the holder.

Thus, rotational force in a rotational direction about an axis perpendicular to the mirror surface is applied to the stopper. In other words, according to the mirror angle controller, no excessive external force is applied to the rod. Therefore, durability of the rod is enhanced so that it is possible to securely hold the mirror.

The housing may be formed in a bowl-shape. In this case, the holder may be formed on a rim of the housing.

The larger the holder is, the more securely the mirror is held. Accordingly, the holder is preferred to be as large as possible. On the other hand, in view of downsizing of the mirror angle controller, the housing is preferred to be as small as possible. Accordingly, it is significantly reasonable that the housing is formed in a bowl-shape and the holder is formed on the rim of the housing. The reason is that in spite of downsizing of the housing, a full size of the housing is used to form the holder. In other words, according to the mirror angle controller, it is possible to downsize the housing while the holder is large enough to securely hold the mirror (that is, the pivot plate). As a result, it is possible to downsize the mirror angle controller.

Moreover, a motor container in which the motor is placed may be formed on the pivot plate side of the housing.

Thus, the motor is installed inside the housing which is included in the actuator so that a space inside the housing is effectively used. Consequently, it makes possible to downsize the mirror angle controller. In addition, as described above, in the mirror angle controller, the ringed sliding part formed in the pivot plate is contact with the ringed holder formed in the housing. Accordingly, neither water nor dust enters inside the housing through between the ringed sliding part and the pivot plate. As a result, it is possible to exclude or simplify watertight sealing for the motor which is placed inside the housing.

In a case where the actuator further includes a cover which covers the motor container, the motor is double watertight so that few failures and the like occur in the motor.

Moreover, when the cover covers the motor container, a stopper may be formed in the cover to prevent the pivot plate from turning in the circumferential direction of the holder.

Thus, the entire actuator becomes compact so that it is possible to downsize the mirror angle controller.

Referring to the accompanying drawings, the following detailed description of exemplary and unlimited embodiments of the present invention will further clarify the above-described aspects and effects and other effects and features of the present invention.

BRIEF DESCRIPTION OF THE DRAWINGS

FIGS. 5(a) and 5(b) are diagrams showing a housing included in the actuator. FIG. 5(a) is a partially cut-out perspective view. FIG. 5(b) is a partially enlarged view of FIG. 5(a).

FIG. 7(a) is an X3-X3 cross section of FIG. 6. FIG. 7(b) is an X4-X4 cross section of FIG. 6.

FIGS. 12(a) and 12(b) are cross sections illustrating movements of the mirror angle controller according to the first embodiment of the present invention.

BEST MODE FOR CARRYING OUT THE INVENTION

Embodiments according to the present invention will be described in detail referring to the accompanying drawings. In each of the following embodiments, description will be given to an example in a case where a mirror angle controller is included in an outer rear view mirror which is installed on a side of a vehicle. In addition, "front and back", "left and right", and "up and down" in the specification indicate directions in a case when the outer mirror is installed on the side of the vehicle.

First Embodiment

Figure 1:
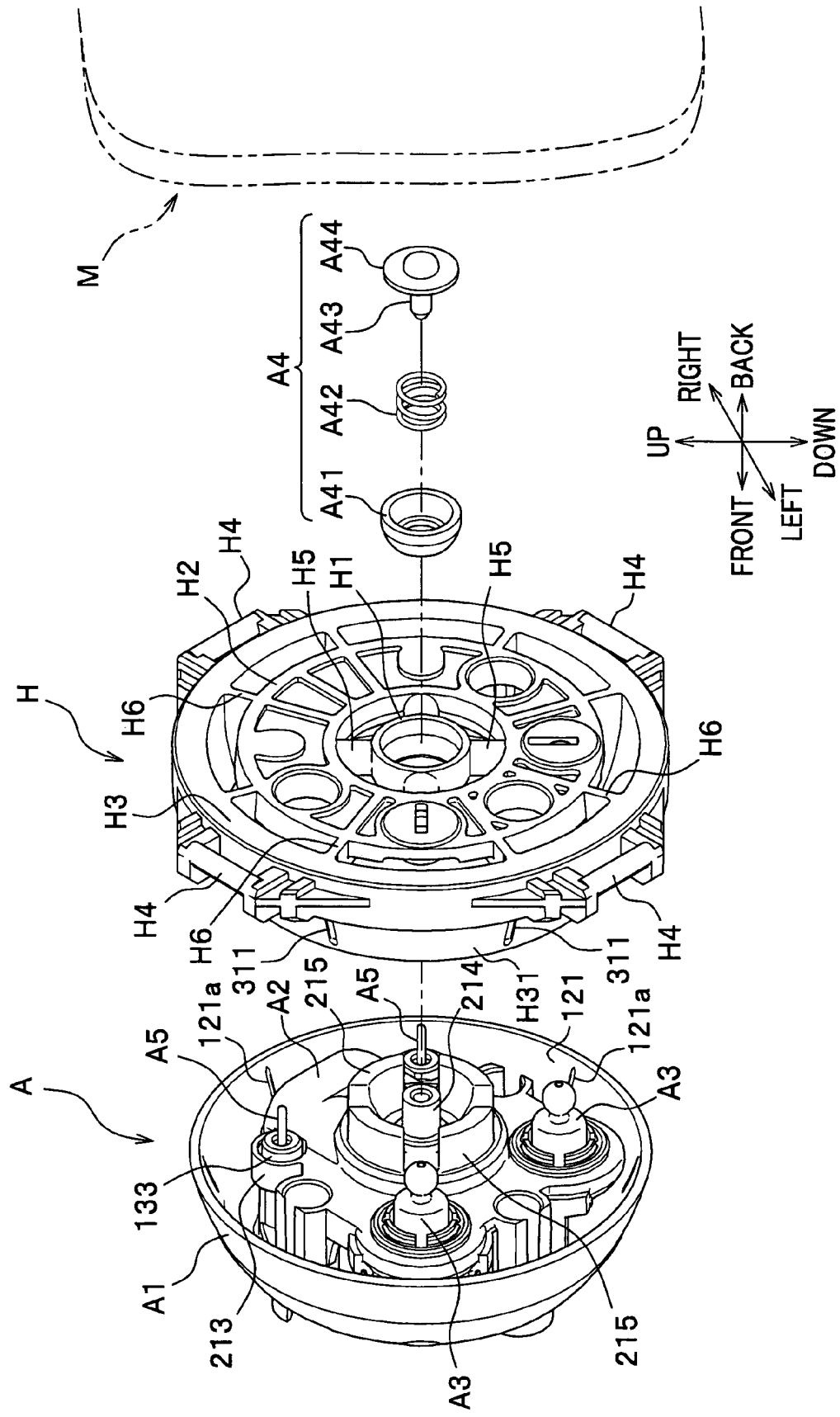
FIG. 1 is an exploded perspective view showing a mirror angle controller according to a first embodiment of the present invention.
Figure 14:
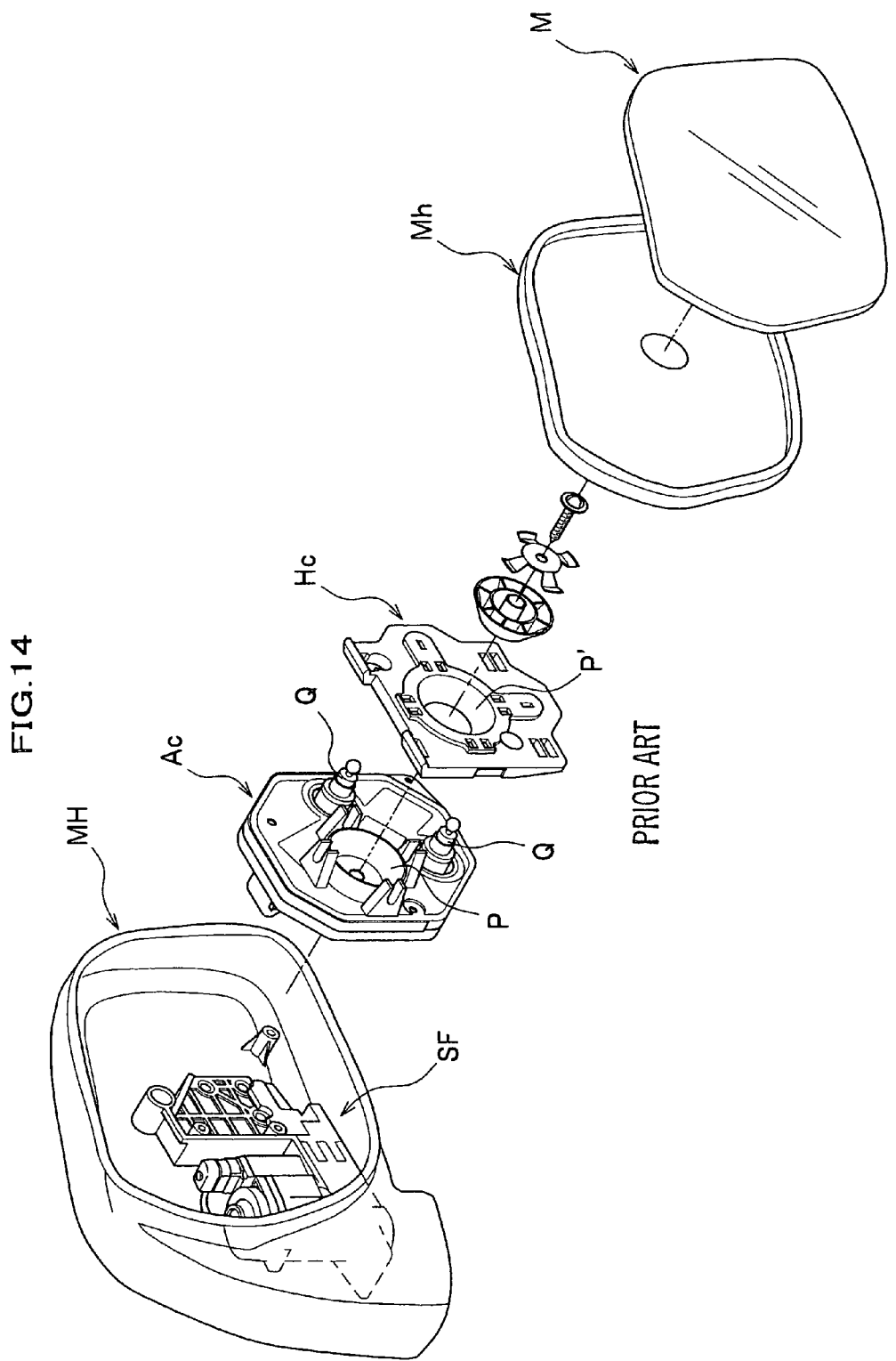
FIG. 14 is an exploded perspective view of the mirror angle controller according to the prior art.

As shown in FIG. 1, a mirror angle controller according to the first embodiment is attached on a reverse side of a mirror M (a front side of a vehicle in the embodiment). The mirror angle controller includes a pivot plate H which holds the mirror M through a mirror holder not shown and an actuator A which holds the pivot plate H. Here, the actuator A is fixed to the mirror housing MH (see FIG. 14) or a support frame SF (see FIG. 14) which is integrally attached to the mirror housing MH.

(Pivot Plate)

The pivot plate H includes a ringed retainer H1 which is formed in the center of the pivot plate H, an inner ring H2 which surrounds a retainer H1, an outer ring H3 which surrounds the inner ring H2, a plurality of mirror attachments H4, H4, . . . which protrude outside the outer ring H3, a plurality of rods H5, H5, . . . which link the ringed retainer H1 with the inner ring H2, and a plurality of link ribs H6, H6, . . . which link the inner ring H2 with the outer ring H3.

The retainer H1 is a spherical segment whose inner peripheral surface is spherically formed. Moreover, a support cap A41, which will be described later, is inserted in and contact with the retainer H1.

Figure 2:
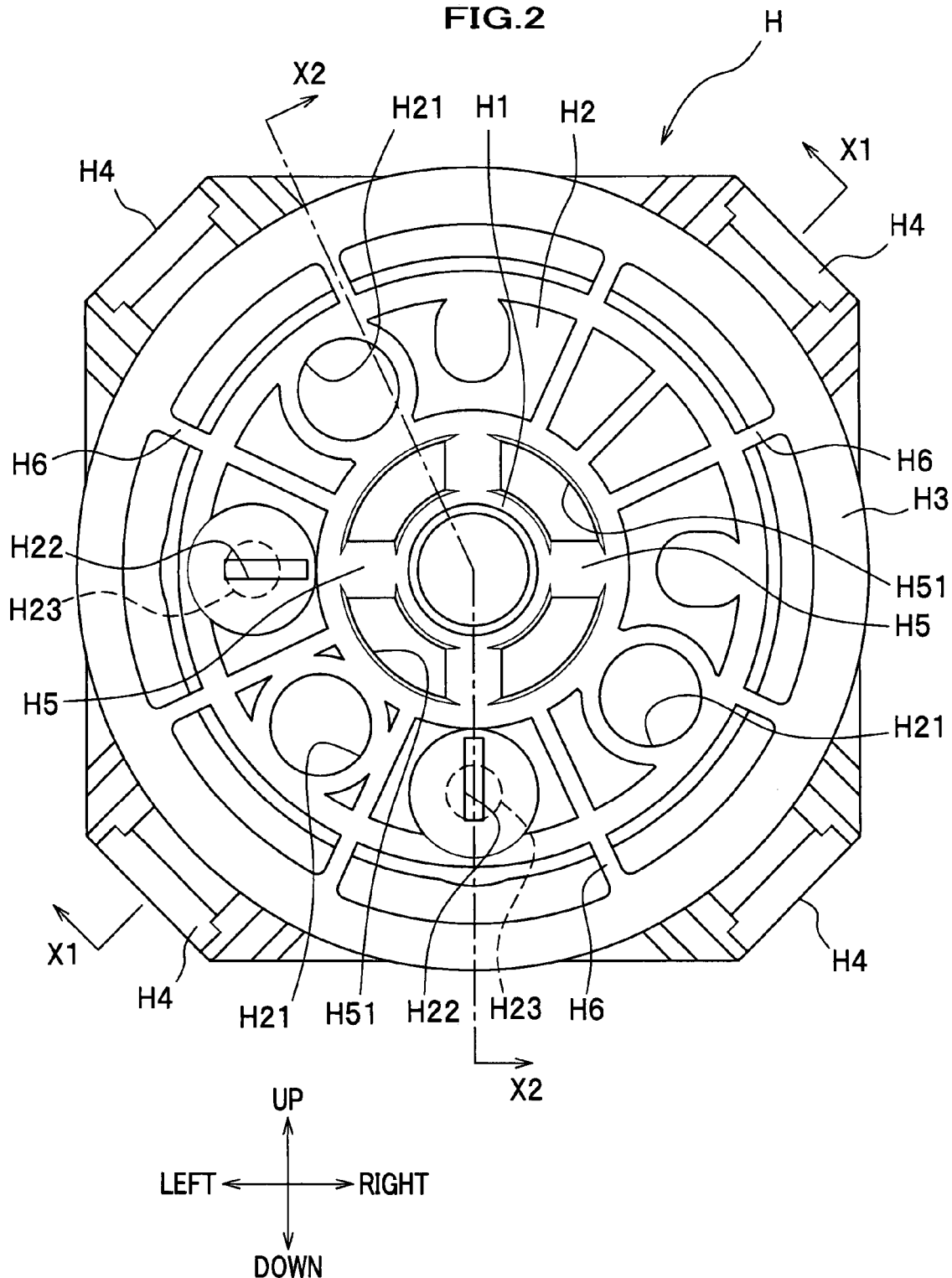
FIG. 2 is a front view of a pivot plate.

As shown in FIG. 2, a plurality of first through holes H21, H21, . . . which are formed in a circle and two second through holes H22 and H22 which are formed in a rectangle are formed in the inner ring H2. Moreover, as shown in FIG. 3(b) which is an X2-X2 cross section of FIG. 2, engaging parts H23 and H23, whose inner surfaces are spherically formed, are formed on the reverse sides (the front side of the vehicle) of the second through holes H22 and H22.

Figure 3:
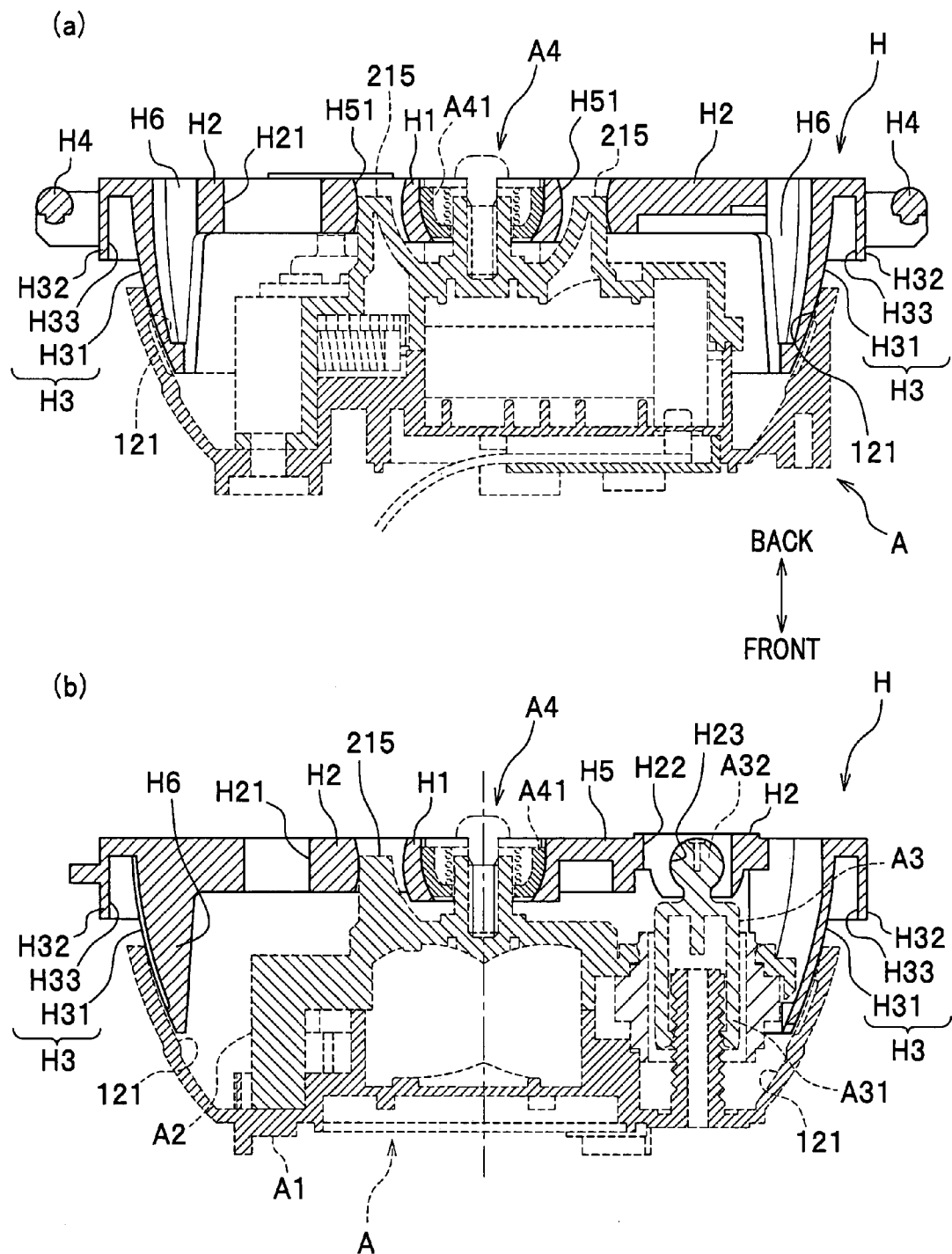
FIG. 3(a) is an X1-X1 cross section of FIG. 2.
FIG. 3(b) is an X2-X2 cross section of FIG. 2.

As shown in FIG. 3(a), which is an X1-X1 cross section of FIG. 2, the outer ring H3 includes a ringed sliding part H31 and an overhang H32 which surrounds the sliding part H31.

As shown in FIG. 1, the sliding part H31 is a spherical segment whose outer peripheral surface is spherically formed. On the outer peripheral surface of the sliding part H31, a plurality of grooves 311, 311, . . . are formed toward the actuator A with predetermined intervals in the circumferential direction. Each of the grooves 311 is formed to face the link rib H6. Lubricant agent such as grease is stored in the groove 311.

As shown in FIGS. 3(a) and 3(b), the overhang H32, whose cross section is formed in a substantially reverse L-shape, forms a retaining groove H33 between the outer surfaces of the sliding part H31 and the overhang H32 itself.

The mirror attachment H4 shown in FIG. 1 is a part engaged with a hook not shown and formed on the reverse side of a mirror holder not shown or the reverse side of the mirror M. In the embodiment, the mirror attachment H4 is protruded from the outer peripheral surface of the overhang H32.

The link rods H5, H5, . . . are arranged to partition a ringed space between the retainer H1 and the inner ring H2. The link rods H5 form sectorial openings H51, H51, . . . (see FIG. 2) in combination with the retainer H1 and the inner ring H2.

The link ribs H6, H6, . . . are arranged to partition a ringed space between the inner ring H2 and the outer ring H3. Moreover, as shown in FIG. 3(b), the link rib H6 is formed in a substantial triangle, whose end (the front end) extends to the end (the front end) of the sliding part H31.

The pivot plate H may be formed of plastic such as polyethylene, polypropylene (PP), and polyacetal (POM), for instance. In this case, it is possible to integrally form the retainer H1, the inner ring H2, the outer ring H3, the mirror attachment H4, the link rod H5, and the link rib H6.

(Actuator)

Figure 4:
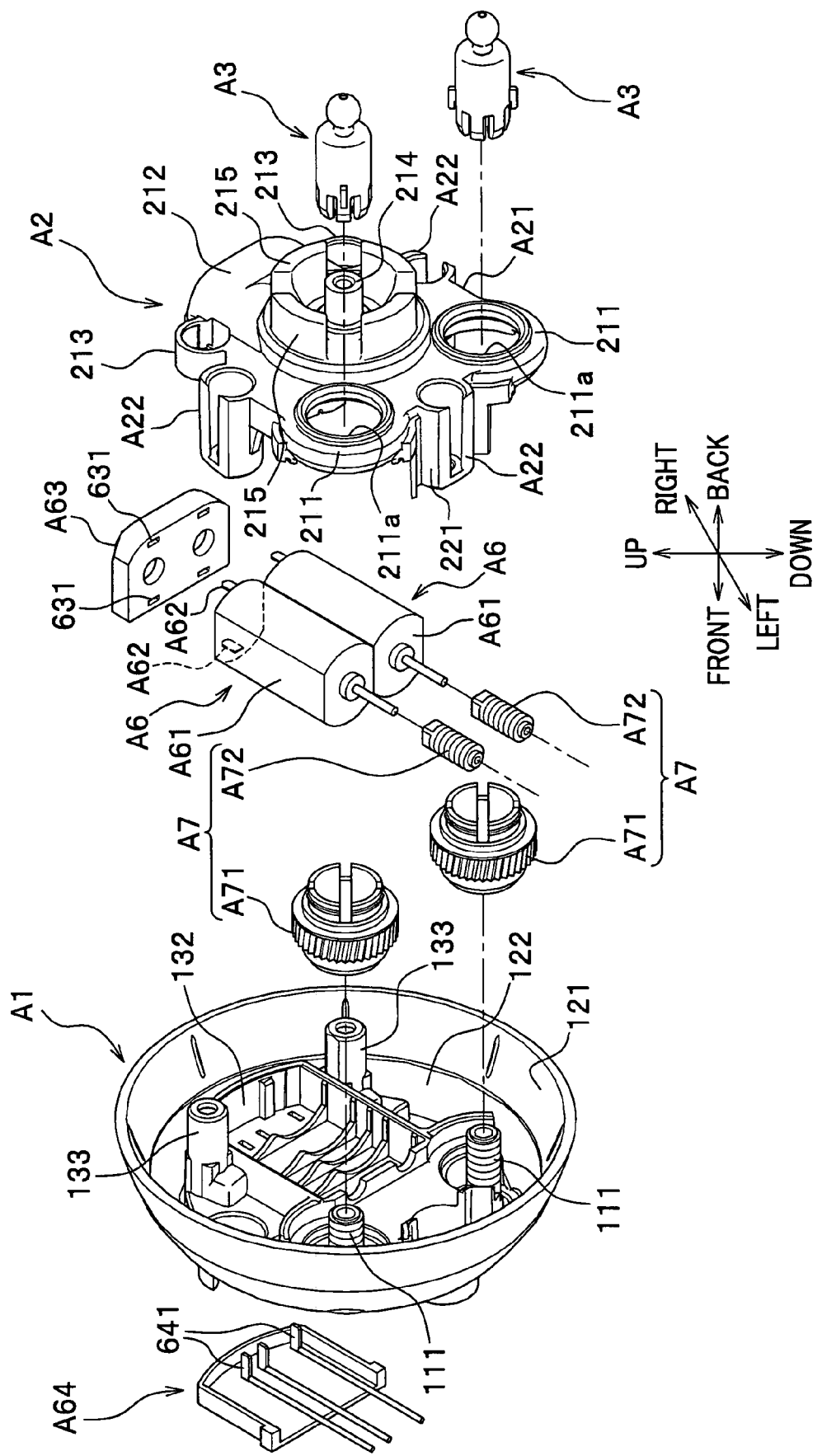
FIG. 4 is an exploded perspective view of an actuator.

As shown in FIG. 1, the actuator A includes a housing A1 which is formed in a bowl-shape, a cover A2 which is fixed to the housing A1, a pair of rods A3 and A3 which push and pull the pivot plate H, a presser A4 which presses the pivot plate H toward the housing A1 side, and a pair of position sensors A5 and A5 which measure tilt of the pivot plate H. As shown in FIG. 4, the actuator A further includes a pair of motors A6 and A6 which supply driving force to the rods A3 and A3, and a pair of gears A7 and A7 which transmit the driving force supplied from the motors A6 and A6 to the rods A3 and A3.

As shown in FIG. 5(a), the housing A1 includes a bottom A11, a ringed peripheral wall A12 which is formed along the outer peripheral rim of the bottom A11, and an island A13 which is formed inside the periphery of the bottom A11.

Figure 6:
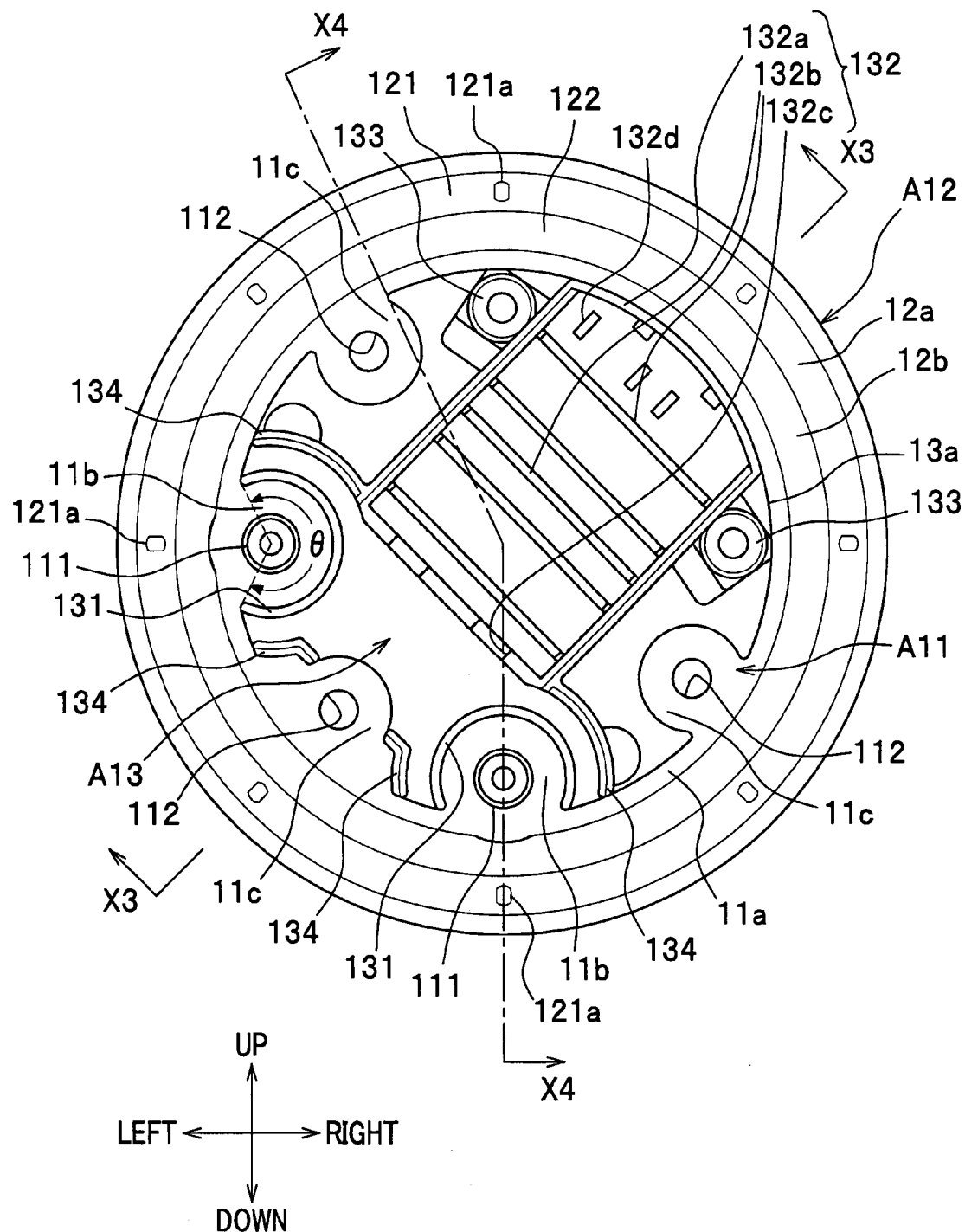
FIG. 6 is a front view of the housing included in the actuator.

As shown in FIG. 6, the bottom A11 includes a ringed area 11a which surrounds the island A13 and a pair of gear installation areas 11b and 11b and a plurality of cover areas 11c, 11c, ... where the island A13 are partially cut away inside the inner periphery of the ringed area 11a. Here, of the pair of gear installation areas 11b and 11b, one gear installation area 11b is formed at the lowest position in the ringed area 11a while the other gear installation area 11b is formed diagonally upward from the one gear installation area 11b. In each gear installation area 11b whose outer rim is formed in a circular arc, a male screw 111 protrudes from the center (see FIG. 5(a)). Moreover, a mounting hole 112 is formed in the center of each cover installation area 11c. The mounting hole 112 is formed in a position corresponding to the first through hole H21 in the pivot plate H shown in FIG. 2.

As shown in FIG. 5(a), the peripheral wall A12 is formed along the outer peripheral rim of the ringed area 11a in the bottom A11. In the embodiment, the peripheral wall A12 includes two ringed areas 121 and 122 on the back and front sides. Hereafter, the ringed area 121 on the back side is referred to as a "holder 121", and the ringed area 122 on the front side is referred to as a "lubricant reservoir 122". In other words, the ringed holder 121 is formed along the back side rim of the housing A1.

Figure 8:
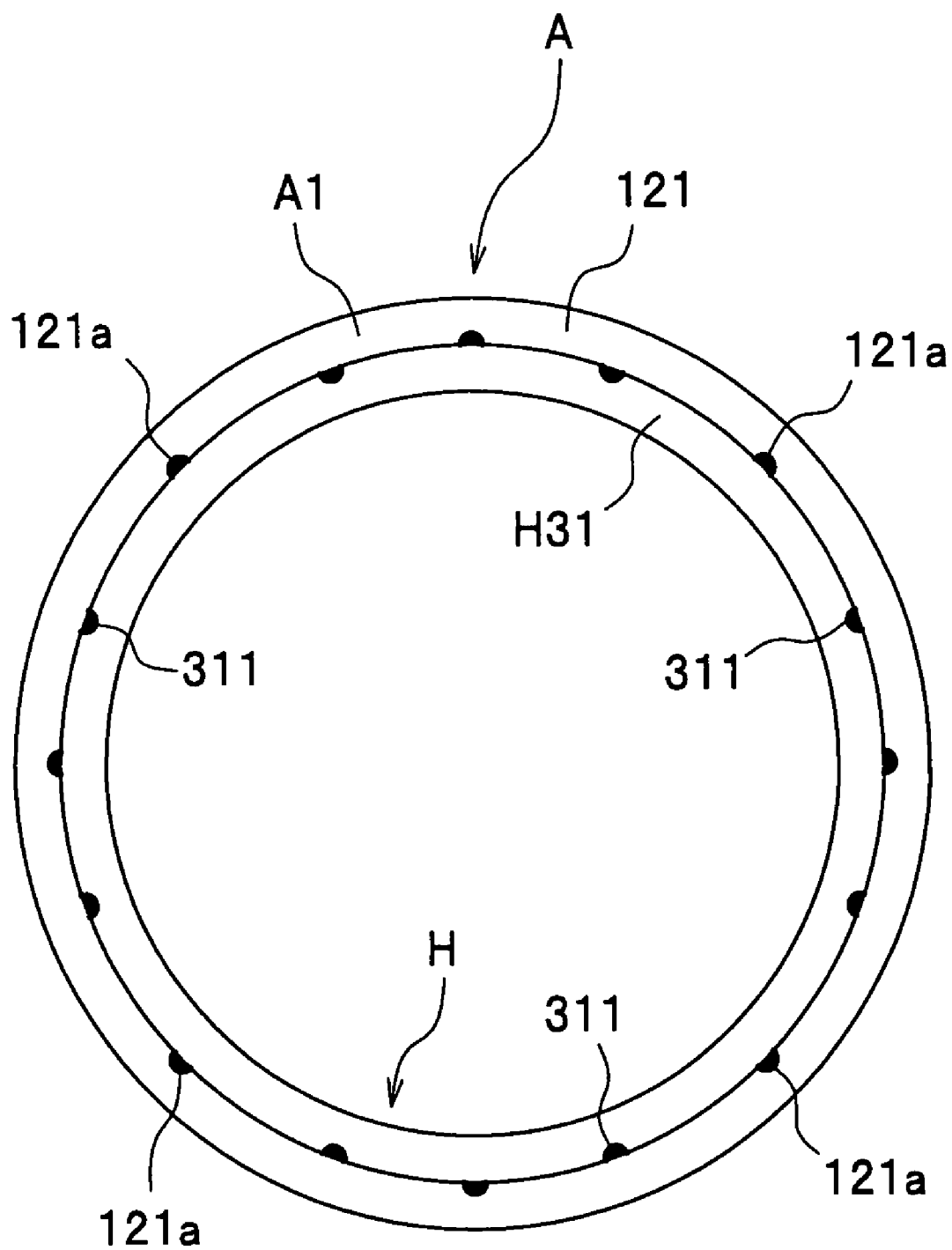
FIG. 8 is a schematic diagram illustrating arrangement of grooves.

The holder 121 is formed in a spherical segment to support and arbitrarily tilt the sliding part H31 (see FIG. 1) in the pivot plate H. As shown in FIGS. 7(a) and 7(b), the inner peripheral surface of the holder 121 is spherically formed. FIG. 7(a) is an X3-X3 cross section of FIG. 6 while FIG. 7(b) is an X4-X4 cross section of FIG. 6. Here, a radius of a sphere which forms the inner peripheral surface of the holder 121 is substantially equal to a radius of a sphere which forms the outer peripheral surface of the sliding part H31 (see FIGS. 3(a) and 3(b)) in the pivot plate H. In other words, the holder 121 is contact with and arbitrarily slides on the outer peripheral surface of the sliding part H31 (see FIGS. 3(a) and 3(b)) in the pivot plate H. Moreover, as shown in FIG. 5(a), on the inner peripheral surface of the holder 121, a plurality of grooves 121a, 121a, ... are formed toward the lubricant reservoir 122 with predetermined intervals in the circumferential direction. Lubricant agent such as grease or the like is reserved in the grooves 121a, 121a .... As shown in a schematic diagram in FIG. 8, each groove 121a in the holder 121 is located between the grooves 311 and 311 which are adjacent in the circumferential direction of the sliding part H31.

As shown in FIG. 5(a), the lubricant reservoir 122 is also formed in a spherical segment whose inner peripheral surface is spherically formed. However, the internal diameter of the lubricant reservoir 122 is larger than that of the holder 121. Therefore, as shown in FIGS. 7(a) and 7(b), there is a step along the boundary between the holder 121 and the lubricant reservoir 122. Moreover, lubricant agent such as grease or the like is applied to the lubricant reservoir 122. Every time the pivot plate H (see FIG. 1) tilts (in other words, every time the sliding part H31 (see FIG. 1) slides on the inner peripheral surface of the holder 121), the lubricant agent applied to the lubricant reservoir 122 is supplied to the inner peripheral surface of the holder 121 and the outer peripheral surface of the sliding part H31 through (that is, after once being stored in) the grooves 121a, 121a, ... in the holder 121 and the grooves 311, 311, ... in the sliding part H31 (see FIG. 1), or directly from the lubricant reservoir 122. As a result, the pivot plate H maintains smooth tilt movements.

As shown in FIG. 5(a), the island A13 protrude backward from the ringed area 11a in the bottom A11. In addition, the outer peripheral rim (the outer peripheral surface) 13a of the island A13 faces the peripheral wall A12 with a space (a groove) in between. In other words, as shown in FIG. 6, the island A13 is formed inside the ringed area 11a in the bottom A11. Accordingly, the outer peripheral rim 13a of the island A13 and the peripheral wall A12 face each other with the ringed area 11a in the bottom A11 in between.

As shown in FIG. 5(a), the island A13 includes a pair of transmission gears 131 and 131 which are formed corresponding to a pair of the male screws 111 and 111, a motor container 132 in which two motors A6 and A6 (see FIG. 2) are mounted, a pair of sensor attachments 133 and 133 which are formed on the both sides of the motor container 132, and a plurality of support walls 134, 134, ... which are formed around each transmission gear 131.

The transmission gear 131 supports an outer peripheral surface of a front end of a worm wheel A71 (see FIG. 4), which will be described later. As shown in FIG. 5(b), the transmission gear 131 is formed around the male screw 111. In the embodiment, the transmission gear 131, which is formed in a substantial C-shape (a circular arc), is formed inside the inner periphery of the ringed area 11a in the bottom A11. Thus, the volume of the transmission gear 131 can be smaller than that of the transmission gear 131 in a case of being formed in a perfect ring with no break. As a result, it is possible to downsize the housing A1. In addition, even if water infiltrates in the actuator A in case, since the transmission gear 131 is not formed in a perfect ring, the water may not stay inside the inner periphery of the transmission gear 131 (that is, around the male screw 111).

To describe the structure of the transmission gear 131 in more detail, the transmission gear 131 includes a first circular arc surface 131a which faces the outer peripheral surface of the male screw 111, a second circular arc surface 131b which faces the outer peripheral surface of the male screw 111 outside the first circular arc surface 131a, and a third circular arc surface (a circular arc surface) 131c which is formed between the first circular arc surface 131a and the second circular arc surface 131b. Here, the central angle of each of the circular arc surfaces 131a, 131b, and 131c (that is, the central angle θ of the transmission gear 131 (see FIG. 6)) is preferably larger than 180 degrees and smaller than 360 degrees. Thus, it is possible to securely support the worm wheel A71. As a result, it is possible to prevent the worm wheel A71 from vibrating in right and left or up and down directions when the worm wheel A71 (see FIG. 4) rotates. Each of the circular arc surfaces 131a, 131b, and 131c only needs to be formed to face itself with the male screw 111 in between.

As shown in FIG. 6, the motor container 132 is formed in a portion from the center to the upper right of the island A13. In the embodiment, the motor container 132 includes a frame which is formed in a substantial rectangle, and a plurality of ribs 132b, 132b, which are formed inside the frame 132a. The upper side of the frame 132a is formed in a circular arc along the outer peripheral rim 13a of the island A13. On the lower side of the frame 132a, two notches 132c and 132c through each of which the worm A72, which will be described later, is inserted are formed. The rib 132b is formed in accordance with the external shape of the motor A6 (see FIG. 4). Moreover, in the upper portion of the motor container 132, three terminal holes 132d, 132d, and 132d are formed. When the terminal holes 132d, 132d, and 132d are placed in the upper portion of the housing A1, even if water infiltrates in the actuator A in case, terminals or the like of the motor A6 (see FIG. 4) never soak in the water.

In the embodiment, as shown in FIG. 5(a), the sensor attachment 133, which is formed in a cylinder, contains various parts included in the position sensor A5 (see FIG. 1 seeing). As shown in FIG. 6, one of the pair of sensor attachments 133 and 133 is formed in the top of the island A1. The other sensor attachment 133 is formed diagonally below the sensor attachment 133. Here, a line segment which connects the male screw 111 and the sensor attachment 133 which face each other in the up-and-down direction with the motor container 132 in between is orthogonal to a line segment which connects the male screw 111 and the sensor attachment 133 which face each other in the left-and-right direction with the motor container 132 in between.

The support wall 134 supports the cover A2 (see FIG. 4), which will be described later. In the embodiment, two small support walls 134 and 134 and two large support walls 134 and 134 are formed in two places, respectively.

For instance, the housing A1 may be formed of plastic such as polyethylene, acrylonitrile butadiene styrene (ABS resin), polybutylene terephthalate (PBT resin), polyamide (PA), and so on. In this case, it is possible to integrally form the bottom A11, the peripheral wall A12, and the island A13.

The cover A2 shown in FIG. 4 includes a main body A21 which covers the island A13 (see FIG. 5(a)) in the housing A1 and a plurality of legs A22, A22, . . . which are formed around the main body A21.

The main body A21 includes a pair of gear holders 211 and 211 which are formed corresponding to the transmission gears 131 and 131 (see FIG. 5(a)), a motor cover 212 which covers the motor container 132, a pair of rings 213 and 213 which are formed corresponding to the sensor attachments 133 and 133, a boss 214 which protrudes from the back surface of the motor cover 212, and four stoppers 215, 215, . . . which are arranged to surround the boss 214.

Figure 11:
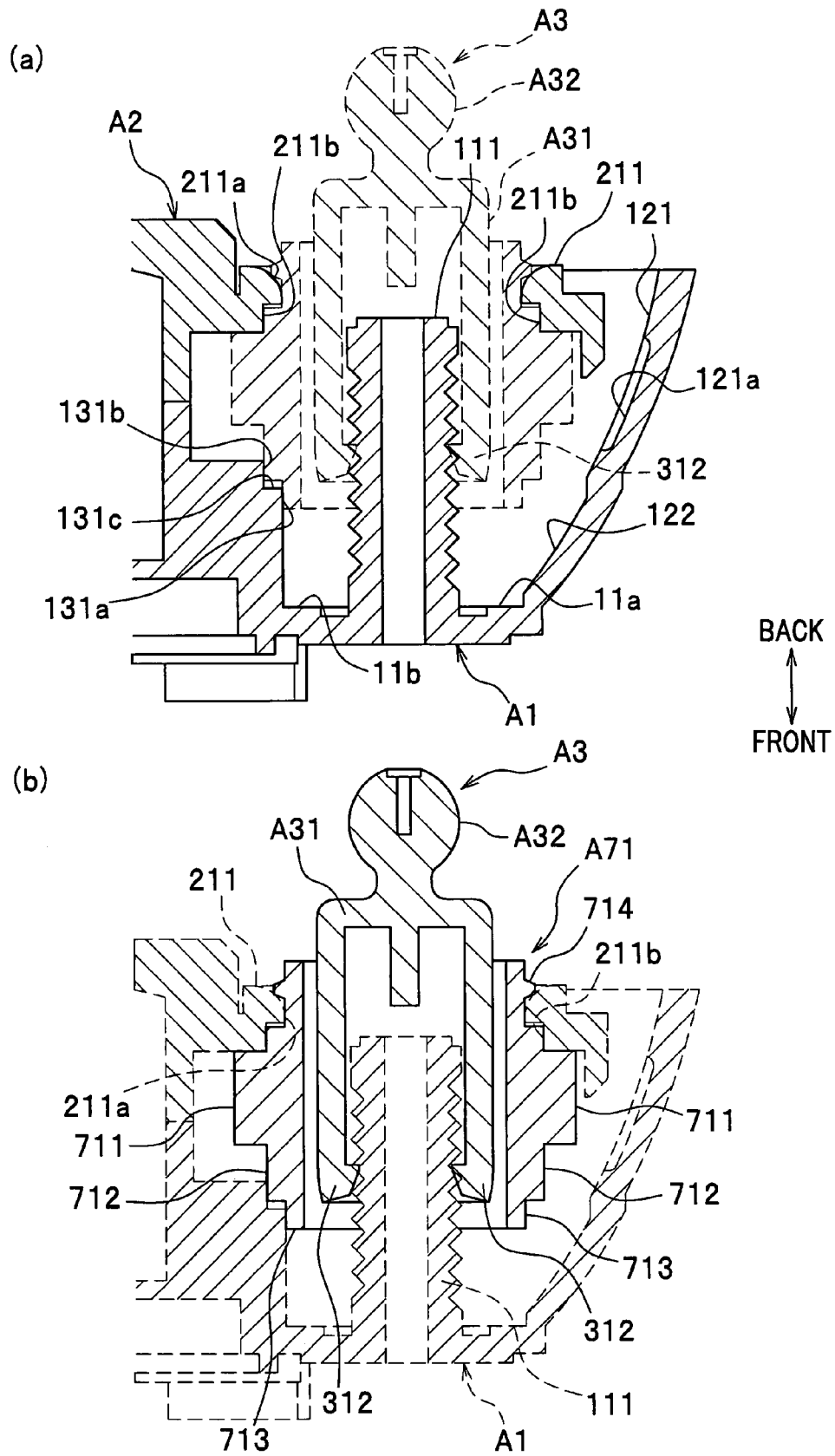
FIG. 11(a) is a cross section of a transmission gear in the housing and a gear holder in the cover.
FIG. 11(b) is a cross section of the rod and the worm wheel.

The gear holder 211 is a part which mainly holds the worm wheel A71 which will be described later. The gear holder 211 holds the worm wheel A71 in such a way that the worm wheel A71 does not slip out in the central axis direction and is able to rotate about the central axis. In the gear holder 211, a circular opening 211a is formed. As shown in FIG. 11(a), a ringed step 211b whose diameter is larger than that of the opening 211a is formed on the peripheral rim of the opening 211a on the housing A1 side.

Figure 9:
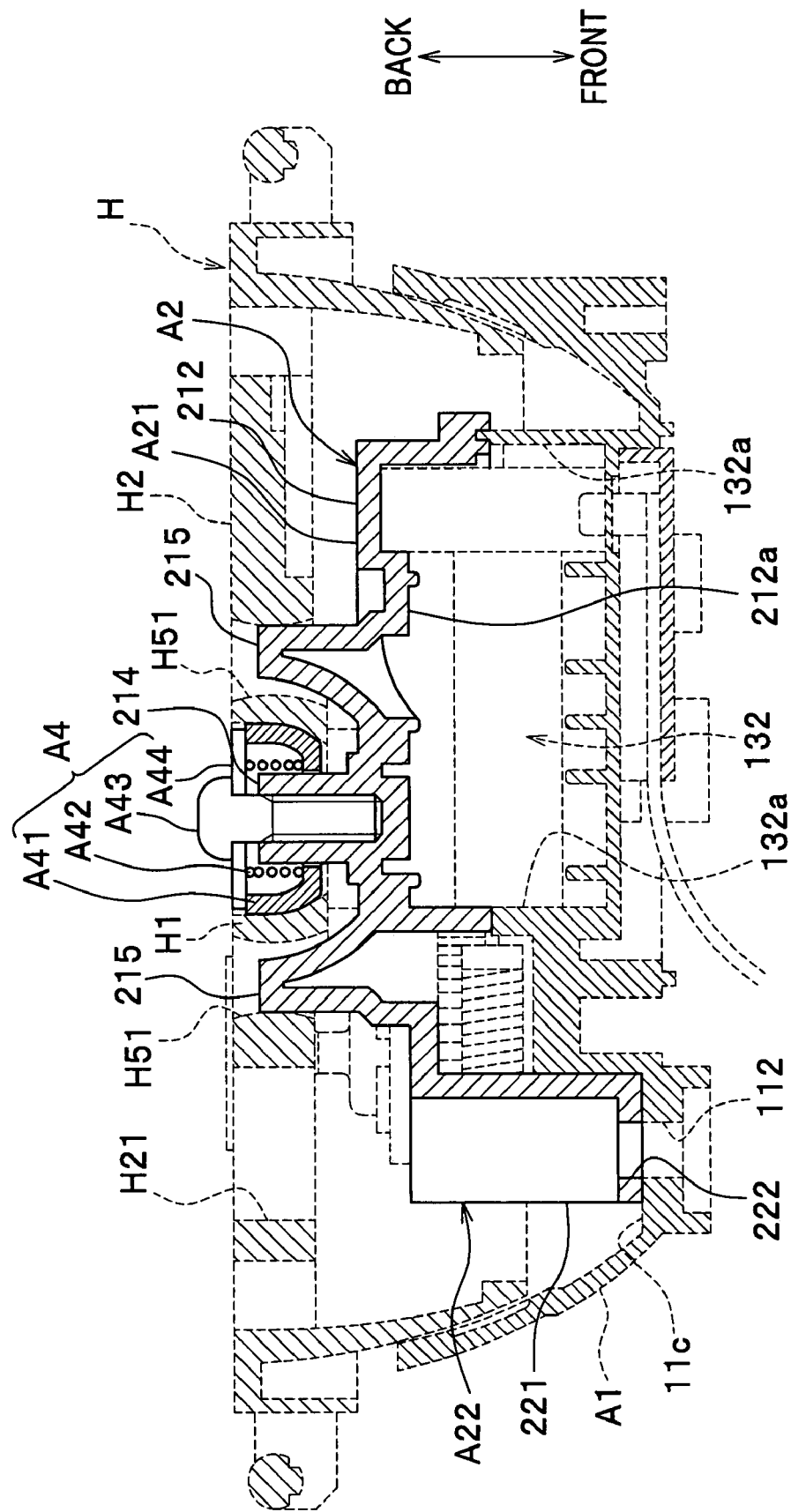
FIG. 9 is a cross section of a cover and a presser which are included in the actuator.

Moreover, as shown in FIG. 9, a motor container 212a on the cover side is recessed along the motor container 132 on the housing A1 side of the motor cover 212. Accordingly, the motor cover 212 covers the motor container 132 to form a substantially watertight space.

The ring 213 shown in FIG. 4 is formed on the outer rim of the main body A21. When the cover A2 is assembled in the housing A1, the ring 213 rings the sensor attachment 133 (see FIG. 1).

The boss 214 is formed in a cylinder with a bottom. As shown in FIG. 9, a screw A43 is screwed inside the boss 214 to hold the support cap A41.

The stopper 215 shown in FIG. 4 prevents the pivot plate H (see FIG. 1) from turning in the circumferential direction of the holder 121. When the pivot plate H is assembled to the actuator A, the end of the stopper 215 is inserted in the opening H51 (see FIG. 2) in the pivot plate H. As shown in FIG. 1, in the state where the cover A2 is assembled to the housing A1, the stopper 215 is surrounded by the holder 121.

Thus, the stopper 215 is formed inside the inner periphery of the housing A1 so that the inside space of the housing A1 is effectively used. Consequently, it is possible to downsize the mirror angle controller.

The legs A22 shown in FIG. 4 is formed in a position corresponding to the cover installation area 11c in the housing A1 (see FIGS. 5(a) and 6). The leg A22 includes a peripheral wall 221 which is formed in a substantial C-shape. As shown in FIG. 9, a screw hole 222 is formed in the bottom of the leg A22 and linked with the mounting hole 112 in the housing A1. To fix the cover A2 to the housing A1, a screw not shown is inserted from the back side through the screw hole 222 in the cover A2 and the mounting hole 112 in the housing A1 while a nut not shown is screwed with an axis of the screw which protrudes toward the front side. Here, the positions of the mounting holes 112 and 112 in the housing A1 correspond to the positions of the first through holes H2 and H2 in the pivot plate H. Accordingly, it is possible to insert a tool not shown inside the leg A22 through the first through hole H21.

For instance, the cover A2 may be formed of plastic such as polyethylene, acrylonitrile butadiene styrene (ABS resin), polybutylene terephthalate (PBT resin), and polyamide (PA). In this case, the main body A21 and the leg A22 may be integrally formed.

Figure 10:
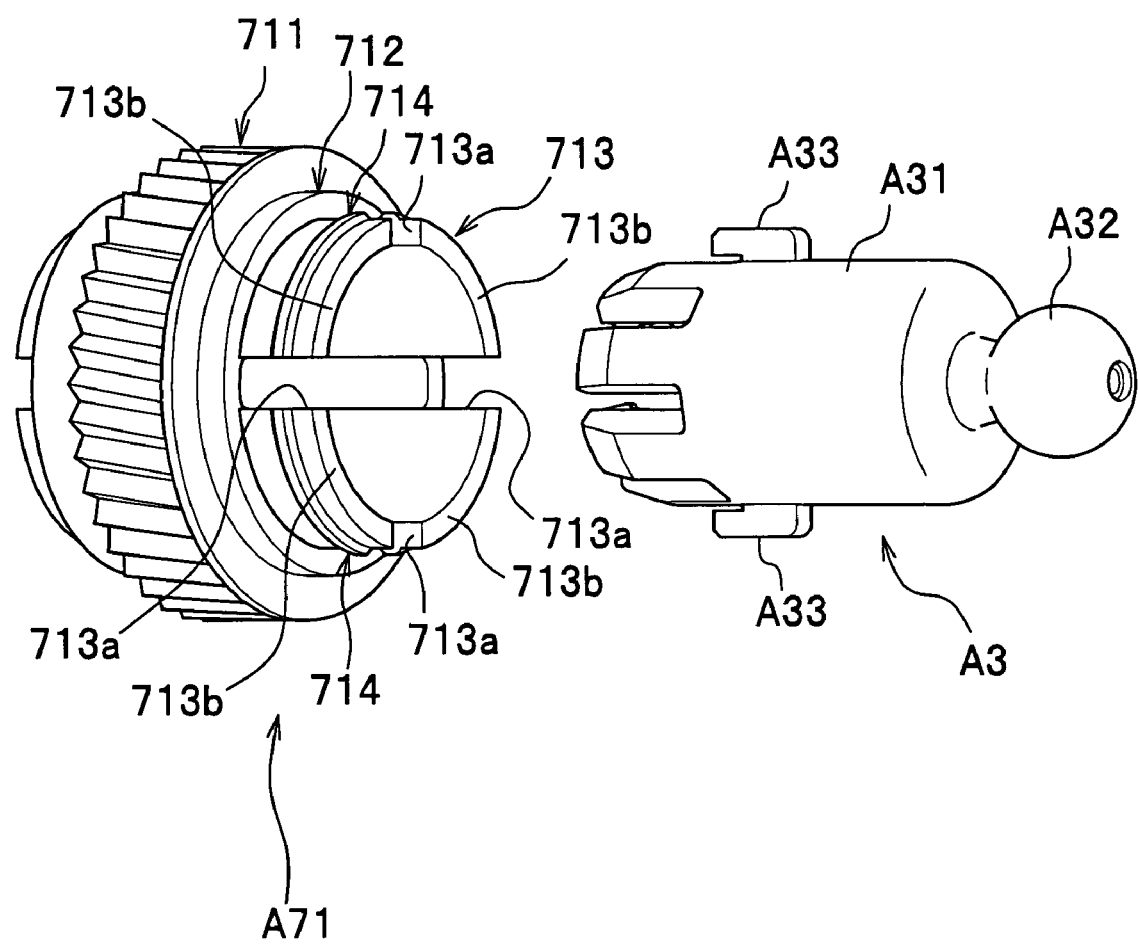
FIG. 10 is a perspective view of a rod and a worm wheel which are included in the actuator.

The rod A3 shown in FIG. 1 moves back and forth to push and pull the pivot plate H. As shown in FIG. 10, the rod A3 includes a cylindrical portion A31, a pivot A32 which is formed at the end of the cylindrical portion A31, and a pair of flanges A33 and A33 which protrude from the outer peripheral surface of the cylindrical portion A31.

As shown in FIG. 11(b), the cylindrical portion A31 is formed in a cylinder and rings the male screw 111 in the housing A1. An end of the cylindrical portion A31 is divided into plural pieces with plural slits (see FIG. 10). A hook 312 which is formed in the inner peripheral surface of the piece is screwed with the thread of the male screw 111. Therefore, when the cylindrical portion A31 rotates about the central axis of the male screw 111, the pivot A32 moves back and forth in the axial direction of the male screw 111.

The pivot A32 whose outer surface is spherically formed engages with the engaging part H23 in the pivot plate H shown in FIG. 3(b). In the embodiment, the pivot A32 engages with the engaging part H23 so as not to slip out. In addition, the outer surface of the pivot A32 is contact with and arbitrarily slides in the inner surface of the engaging part H23.

In the embodiment, of the pair of rods A3 and A3 in the housing A1 shown in FIG. 1, when a rod A3 placed in a lower portion moves back and forth, the pivot plate H (that is, the mirror M) tilts up and down about the retainer H1. Meanwhile, when the other rod A3 moves back and forth, the pivot plate H (that is, the mirror M) tilts left and right about the retainer H1.

The presser A4 shown in FIG. 1 keeps pressing the pivot plate H forward (that is, toward the actuator A) to combine the pivot plate H with the actuator A. The presser A4 includes a support cap A41 which is inserted in and engages with the retainer H1 in the pivot plate H, a pressing member A42 which applies pressing force to the support cap A41, a screw A43 which is screwed with the boss 214 in the actuator A, and a washer A44 which rings the screw A43.

The support cap A41 is formed in a spherical segment whose outer peripheral surface is spherically formed. Here, as shown in FIG. 9, a radius of a sphere which forms the outer peripheral surface of the support cap A41 is substantially equal to a radius of a sphere which forms the inner peripheral surface of the retainer H1 in the pivot plate H. In other words, the outer peripheral surface of the support cap A41 is contact with and arbitrarily slides on the inner peripheral surface of the retainer H1 in the pivot plate H.

The pressing member A42 is placed in a state of being pressed between the support cap A41 and the washer A44. The support cap A41 is pressed toward the actuator A by resilient force of the pressing member A42. In the embodiment, a spring is employed as the pressing member A42. However, it is easily understood that the pressing member A42 is not limited to this.

The washer A44 is formed in a size and a shape substantially equal to a back end surface of the support cap A41. Accordingly, it is possible to prevent the support cap A41 from slipping out of the retainer H1.

The presser A4 is only required to press the support cap A41 toward the actuator A. Accordingly, the presser A4 is not limited to the structure shown. For instance, a disc spring not shown may be employed as the pressing member A42. In this case, the disc spring is provided in place of the washer A44.

The position sensor A5 shown in FIG. 1 detects tilt of the pivot plate H. In the embodiment, the position sensor A5 is mounted on the sensor attachment 133. In the embodiment, though a structure and form of the position sensor A5 are not in particular limited, a position sensor including a contact is employed. The contact is attached to the sensor attachment in a state of being pressed toward the pivot plate H. Thus, the end of the contact always touches the front surface (the reverse surface) of the pivot plate H and moves back and forth following the pivot plate H which tilts. Then, a movement amount (protrusion amount) of the contact is measured so that a state (a tilting degree) of the pivot plate H is detected.

The motor A6 shown in FIG. 4 includes a motor body A61 and a pair of male terminals A62 and A62 which protrude from the motor body A61. The pair of male terminals A62 and A62 are connected to an adaptor A63. The adaptor A63 is placed between the pair of motors A6 and A6 which are placed in parallel and a terminal board A64 which is attached on the front side of the housing A1. On the surface of the adaptor A63 which faces the pair of motors A6 and A6, four female terminals 631 are formed in total. The four female terminals 631 are respectively connected to the four male terminals A62 in total of the pair of motors A6 and A6. Meanwhile, on the surface which faces the motor container 132 in the adaptor A63, three female terminals not shown are formed corresponding to the terminal holes 132d, 132d, and 132d in the motor container 132 (see FIG. 5(a)). One of two female terminals 631 and 631 to which male terminals A62 and A62 of one motor A6 are respectively connected is short-circuited inside the adaptor A63 with one of two female terminals 631 and 631 to which male terminals A62 and A62 of the other motor A6 are respectively connected.

The gear A7 shown in FIG. 4 includes the worm wheel A71 which rings the male screw 111 in the housing A1, and the worm A72 which is attached to the output axis of the motor A6. The worm A72 meshes with a gear 711 of the worm wheel A71 (see FIG. 10) to transmit rotation force of the motor A6 to the worm wheel A71.

The worm wheel A71 transmits to the rod A3 the rotation force of the motor A6 which is transmitted from the worm A72. The worm wheel A71 rings the male screw 111 with a clearance which accommodates the rod A3 between the inner peripheral surface of the worm wheel A71 and the outer peripheral surface of the male screw 111.

As shown in FIG. 10, to describe the structure of the worm wheel A71 in more detail, the worm wheel A71 includes the gear 711 on whose outer peripheral surface teeth are formed, an outer cylinder 712 which is formed inside the inner peripheral surface of the gear 711, an inner cylinder 713 which is formed inside the inner peripheral surface of the outer cylinder 712, and a stopper 714 which is formed on the outer peripheral surface of the back end of the inner cylinder 713.

The front and back ends of the outer cylinder 712 protrude from the gear 711 (see FIG. 11(b)). The outer peripheral surfaces of the protruded portions form cylindrical lateral surfaces. Moreover, more than half around the cylindrical lateral surface of the front end of the outer cylinder 712 is contact with and arbitrarily slides on the second circular arc surface 131b of the transmission gear 131 in the housing A1 shown in FIG. 5(b) (see FIGS. 11(a) and 11(b)). Meanwhile, the whole cylindrical lateral surface of the back end of the outer cylinder 712 is contact with and arbitrarily slides on the ringed step 211b in the cover A2 shown in FIG. 11(a).

As shown in FIG. 10, the front and back ends of the inner cylinder 713 protrudes from the outer cylinder 712. The outer peripheral surfaces of the protruded portions form cylindrical lateral surfaces. Here, the inner cylinder 713 is divided into a plurality (four in the embodiment) of pieces 713b, 713b, . . . by a plurality of slits 713a, 713a, . . . which are formed in the central axis direction of the inner cylinder 713. In addition, each piece 713b is elastically deformable inward. Moreover, more than half around the cylindrical lateral surface of the front end of the inner cylinder 713 is contact with and arbitrarily slides on the first circular arc surface 131a of the transmission gear 131 in the housing A1 shown in FIG. 5(b) (see FIGS. 11(a) and 11(b)). Meanwhile, the whole cylindrical lateral surface of the back end of the inner cylinder 713 is contact with and arbitrarily slides on the opening 211a in the cover A2 shown in FIG. 11(a). As shown in FIG. 10, slits 713a, 713a, . . . are serially formed in the central axis direction of the inner cylinder 713. Moreover, the flanges A33 and A33 of the rod A3 engage with the slits 713a and 713a.

As shown in FIG. 10, the stopper 714 includes a protruded line which protrudes along the circumferential direction of the inner cylinder 713 in the outer surface of the back end of the inner cylinder 713. As shown in FIG. 11(b), the stopper 714 is engaged and fixed with the rim of the opening 211a in the gear holder 211. Thus, the stopper 714 prevents the worm wheel A71 from slipping out of the opening 211a. A groove not shown and is recessed along the circumferential direction of the inner cylinder 713 may be provided as the stopper 714. In this case, a protruded line which fits in the groove may be formed in the opening 211a in the gear holder 211.

To assemble such a structure of the worm wheel A71 in the actuator A, the back end of the worm wheel A71 is held by the gear holder 211 in the cover A2. Then, the cover A2 is fixed in a predetermined position in the housing A1. To engage the back end of the worm wheel A71 with the gear holder 211 in the cover A2, the back end of the inner cylinder 713 in the worm wheel A71 is elastically transformed inward and inserted in the opening 211a in the gear holder 211. Then, the stopper 714 is engaged and fixed with the rim of the opening 211a in the gear holder 211.

When the worm wheel A71 is installed in such a way, it is only required to insert the back end of the worm wheel A71 into the gear holder 211 in the cover A2. Thus, the worm wheel A71 is held in the gear holder 211 so as not to slip out in the central axis direction (front-and-back direction) but to arbitrarily slide and rotate about the central axis (in the circumferential direction). Therefore, it is possible to easily and quickly position the axis. As a result, it is possible to simplify assembling of the actuator A. In the embodiment, in the front end of the worm wheel A71, more than half around the outer peripheral surface of the inner cylinder 713 is contact with the first circular arc surface 131a of the transmission gear 131 shown in FIG. 5(b). In addition, more than half around the outer peripheral surface of the outer cylinder 712 is contact with the second circular arc surface 131b of the transmission gear 131 shown in FIG. 5(b). Accordingly, the front end of the worm wheel A71 never vibrates up and down or left and right.

Next, referring to FIGS. 1 and 4, movements of the actuator A will be described. A controller not shown controls the motor A6 to rotate in an appropriate direction. Thus, the rotation force of the motor A6 is transmitted to the worm wheel A71 through the worm A72. Then, the worm wheel A71 rotates about the male screw 111 in the housing A1. The flange A33 (see FIG. 10) of the rod A3 engages with the slit 713a (see FIG. 10) in the worm wheel A71 so as not to relatively turn. Therefore, when the worm wheel A71 rotates, the rod A3 rotates about the male screw 111 in synchronization with rotation of the worm wheel A71. In addition, the hook 312 (see FIG. 11) of the rod A3 is screwed with the thread of the male screw 111. Accordingly, the rod A3 rotates about the male screw 111 so as to move back and forth in the axial direction of the male screw 111. As a result, the rod A3 pushes and pulls the pivot plate H in the front and back directions. Thus, the pivot plate H tilts with respect to the actuator A (see FIGS. 12(a) and 12(b)).

As shown in FIG. 1, in the mirror angle controller in such a structure, the rods A3 and A3 in the actuator A which push and pull the pivot plate H are arranged inside the holder 121 which supports the pivot plate H. Thus, load applied to the mirror M is mostly applied to the holder 121. Therefore, even in a case where there is backlash between the rod A3 and the pivot plate H, or a case where the rod A3 itself has a dimension error or a mounting error, it is possible to securely hold the mirror M. Moreover, the ringed sliding part H31 formed in the pivot plate H is always contact with the ringed holder 121 formed in the housing A1. Consequently, neither water nor dust enters between the ringed sliding part H31 and the ringed holder 121. As a result, it is possible to exclude or simplify watertight sealing around the rod A3 which is placed inside the holder 121.

The larger the holder 121 is, the more securely the mirror is held. Therefore, the holder 121 is preferred to be as large as possible. Meanwhile, in view of downsizing of the mirror angle controller, the housing A1 is preferred to be as small as possible. However, in the embodiment, the housing A1 is formed in a bowl-shape. In addition, the holder 121 is formed on the rim to make the maximum use of the size of the housing A1. Thus, it is possible to downsize the housing A1 while the holder 121 is large enough to securely hold the pivot plate H. As a result, it is possible to downsize the mirror angle controller.

In addition, the mirror angle controller includes the stopper 215 which prevents the pivot plate H from turning. Therefore, rotation force about an axis perpendicular to the mirror surface of the mirror M is applied to the stopper 215. In other words, according to the mirror angle controller, no extra external force is applied to the rod A3. Accordingly, it is possible to enhance durability of the rod A3. As a result, it is possible to securely hold the mirror M.

Moreover, the stopper 215 is surrounded by the holder 121 in the housing A1. In other words, the stopper 215 is formed inside the housing A1. Therefore, it is possible to effectively use the space inside the housing A1. As a result, it is possible to downsize the mirror angle controller.

Moreover, in the mirror angle controller, the motor container 132 in which the motors A6 and A6 are placed is formed on the pivot plate H side of the housing A1. Therefore, it is possible to effectively use the space inside the housing A1. As a result, it is possible to downsize the mirror angle controller. In addition, the mirror angle controller further includes the cover A2 which covers the motor container 132. Accordingly, the motor A6 is double watertight so that a failure and the like hardly occurs in the motor A6.

Furthermore, in the mirror angle controller, the plurality of grooves 121a, 121a, are formed on the inner peripheral surface of the holder 121 in the housing A1. In addition, the plurality of grooves 311, 311, . . . are formed on the outer peripheral surface of the sliding part H31 in the pivot plate H. Therefore, every time the pivot plate H tilts (in other words, every time the sliding part H31 slides on the inner peripheral surface of the holder 121), the grease applied to the lubricant reservoir 122 is supplied to the inner peripheral surface of the holder 121 and the outer peripheral surface of the sliding part H31 through the grooves 121a, 121a, . . . on the holder 121 and the grooves 311, 311, . . . on the sliding part H31, or directly from the lubricant reservoir 122. As a result, the pivot plate H maintains smooth tilt movements. Even when the grooves are formed in either one of the inner peripheral surface of the holder 121 in the housing A1 or the outer peripheral surface of the sliding part H31 in the pivot plate H, there are similar effects to those described above.

Moreover, as shown in FIG. 5(b), in the mirror angle controller, the transmission gear 131 in the housing A1 is formed in a substantial C-shape (a circular arc). Therefore, the volume of the transmission gear 131 can be smaller than that of the transmission gear 131 in a case of being formed in a perfect ring with no break. As a result, it is possible to downsize the housing A1. In addition, even if water infiltrates in the actuator A in case, since the transmission gear 131 is not formed in a perfect ring, the water may not stay inside the inner periphery of the transmission gear 131 (that is, around the male screw 111).

Furthermore, as shown in FIG. 5(a), in the mirror angle controller, the island A13 which protrudes from the bottom A11 is placed inside the inner periphery of the ringed area 11a in the bottom A11. Therefore, there is a ringed space (a groove) between the peripheral wall A12 and the island A13 in the housing A1. Consequently, as shown in FIG. 12(b), the end rim of the sliding part H31 can be inserted deeply into the housing A1. In other words, in the mirror angle controller, the pivot plate H moves within a larger range than that in a case where there is no ringed space (groove). When the pivot plate H is designed to move within the same range with that in the case where there is no ringed space (groove), the housing A1 can be smaller. As a result, it is possible to downsize the mirror angle controller.

As shown in FIG. 12(b), in the mirror angle controller, the mirror attachment H4 is protruded from the outer peripheral surface of the overhang H32 in the pivot plate H. In addition, the overhang H32 forms the ringed retaining groove H33 around the sliding part H31. Therefore, when the pivot plate H tilts, the end rim of the holder 121 in the housing A1 is inserted into the retaining groove H33 and not in contact with the mirror attachment H4. In other words, in the mirror angle controller, the pivot plate H moves within a larger range than that in a case where there is no ringed retaining groove H33. Moreover, when the pivot plate H is designed to move within the same range with that in the case where there is no ringed retaining groove H33, the pivot plate H can be smaller. As a result, it is possible to downsize the mirror angle controller.

Moreover, as shown in FIG. 11(b), in the mirror angle controller, the back end of the worm wheel A71 is held mainly by the gear holder 211 in the cover A2. Therefore, even when there is an assembling error in assembling the cover A2 to the housing A1, the assembling error exerts little effect on accuracy in assembling the worm wheel A71. Moreover, in a state where the worm wheel A71 is held by the cover A2, the axis of the worm wheel A71 is positioned. Thus, it is possible to simplify assembling of the actuator A. In addition, in a case where the worm wheel A71 is in advance held by the cover A2, the cover A2 is merely assembled to the housing A1 to complete assembling of the worm wheel A71.

Second Embodiment

Figure 13:
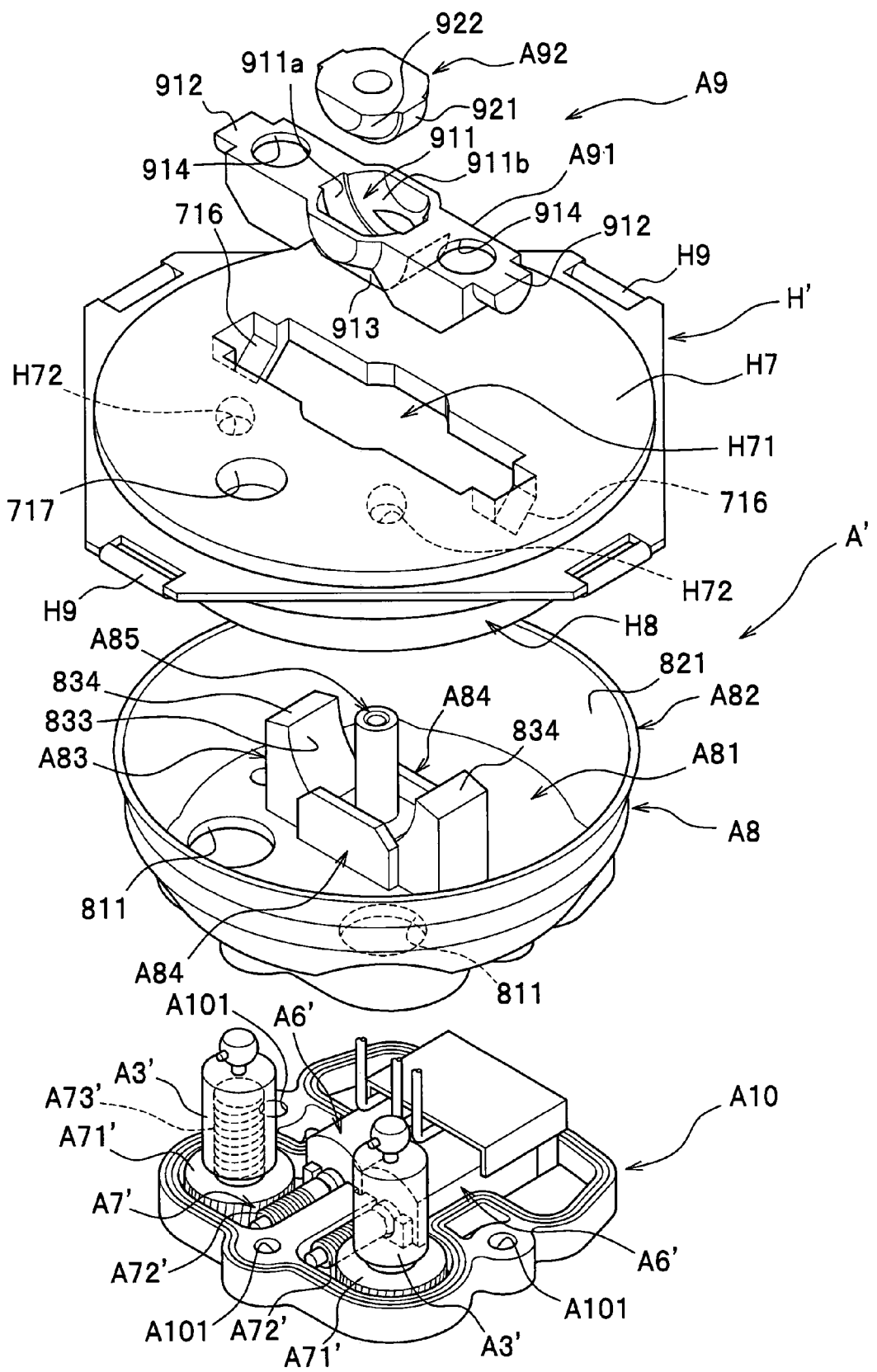
FIG. 13 is an exploded perspective view of the mirror angle controller according to a second embodiment of the present invention.

As shown in FIG. 13, a mirror angle controller according to the second embodiment includes a pivot plate H' which is attached on the reverse side of the mirror M (see FIG. 14), and an actuator A' which holds the pivot plate H'.

(Pivot Plate)

The pivot plate H' includes a disc holder body H7, a ringed sliding part H8 which is protruded toward the front side of the holder body H7, and a plurality of mirror attachments H9, H9, ... which protrude outside the holder body H7.

An opening H71 is formed in a substantial rectangle along the diameter of the holder body H7. In addition, bearings 716 and 716 are formed at the both ends of the opening H71. Moreover, engaging parts H72 and H72 which are respectively engaged with ends of rods A3' and A3', which will, be described later, are formed inside the inner periphery of the sliding part H8 on the front side of the holder body H7. Moreover, in the holder body H7, a through hole 717 is formed in a position which corresponds to a mounting hole A101 in the sub-housing A10.

The sliding part H8 is formed in a spherical segment whose outer peripheral surface is spherically formed.

The structure of the mirror attachment H9 is similar to that of the mirror attachment H4 (see FIG. 1) in the first embodiment, and therefore not described in detail here.

(Actuator)

The Actuator A' includes a housing A8 which is formed in a bowl-shape, a presser A9 which presses the pivot plate H' to the housing A8 side, and a sub-housing A10 which is fixed on the front side of the housing A8. Moreover, the sub-housing A10 includes a pair of rods A3' and A3' which move back and forth relatively to the pivot plate H', a pair of motors A6' and A6' which provide driving force to the rods A3' and A3', and a pair of gears A7' and A7' which transmit the driving force of the motors A6' and A6' to the rods A3' and A3'.

The housing A8 includes a bottom A81 which is formed in a disc, a ringed peripheral wall A82 which is formed on the outer peripheral rim of the bottom A81, a stopper A83 which protrudes from the center of the bottom A81, a pair of plates A84 and A84 which face each other with the stopper A83 in between, and a boss A85 which protrudes from the center of the stopper A83.

A pair of rod holes 811 and 811 through which the rods A3' and A3' are inserted are formed in the bottom A81. Moreover, an attachment not shown is formed on the front side of the bottom A81 in accordance with a shape of the sub-housing A10. In the bottom A81, an insert hole not shown is formed in a position corresponding to each mounting hole A101 in the sub-housing A10.

A ringed holder 821 is formed on the back side rim of the peripheral wall A82. In other words, the housing A8 includes the ringed holder 821 which is placed to surround the rod A3'. The holder 821 whose inner peripheral surface is spherically formed is contact with the outer peripheral surface of the sliding part H8 in the pivot plate H'.

The stopper A83 prevents the holder 821 in the pivot plate H' from turning in the circumferential direction. In the embodiment, the stopper A83 is formed in a substantial C-shape, whose inner surface 833 is formed in a cylindrical inner lateral surface to face itself with the boss A85 in between. The ends 834 and 834 of the stopper A83 fit and arbitrarily slide on the both sides of a protrusion 913 in a first support cap A91, which will be described later.

The presser A9 includes the first support cap A91 which is contact with the opening H71 formed in the holder body H7 in the pivot plate H', a second support cap A92 which is contact with a recession 911 formed in the center of the first support cap A91, and a pressing member not shown and a screw (see FIG. 1).

The first support cap A91 includes the recession 911 which is formed in the center, axes 912 and 912 which are respectively formed at the both ends, and a protrusion 913 which is formed on the reverse side of the recession 911. Moreover, a through hole 914 is formed between the recession 911 and each axis 912. The through hole 914 is formed in the position corresponding to the mounting hole A101 in the sub-housing A10.

A sliding groove 911a is formed in the inner peripheral surface of the recession 911. Moreover, a slot not shown through which the boss A85 in the housing A8 is inserted is formed in the bottom (the deepest portion) of the recession 911. The inner peripheral surface of the sliding groove 911a is formed in a cylindrical inner lateral surface. In addition, the inner peripheral surfaces 911b and 911b of the recessions 911 and 911 on the both sides of the sliding groove 911a are spherically formed.

The axis 912 is formed in a semicircular column shape and fits in the bearing 716 in the pivot plate H'. In other words, the pivot plate H' turns about the central axis (a line which connects the axes 912 and 912) of the first support cap A91.

The outer surface of the protrusion 913 is formed in a cylindrical lateral surface. When the pivot plate H' is assembled in the housing A8 in the actuator A', the outer surface of the protrusion 913 fits between the pair of plates A84 and A84, as well as, is contact with and arbitrarily slides on the inner surface 833 of the stopper A83. In other words, the protrusion 913 of the first support cap A91 slides along the inner surface 833 of the stopper A83. Thus, the first support cap A91 tilts with respect to the housing A8. Then, the pivot plate H' also tilts in synchronization with the movement of the first support cap A91 which tilts.

A sliding protrusion 921 which fits in the sliding groove 911a in the first support cap A91 is formed on the outer surface of the second support cap A92.

The outer peripheral surface of the sliding protrusion 921 is formed on a cylindrical lateral surface and is contact with and arbitrarily slides on the cylindrical inner lateral surface of the sliding groove 911a in the first support cap A91. The outer peripheral surfaces 922 and 922 of the second support cap A92 on the both sides of the sliding protrusion 921 are spherically formed so as to be contact with and arbitrarily slide on the inner peripheral surfaces 911b and 911b of the recession 911 in the first support cap A91.

In the sub-housing A10, a motor container and a transmission gear are formed, and a pair of motors A6' and A6' and a pair of gears A7' and A7' are assembled. In the embodiment, a male screw A73' is protruded from a worm wheel A71' included in a gear A7' and turns integrally with the worm wheel A71'. In addition, the rod A3' is screwed with the male screw A73'. By the way, the rod A3' engages with the engaging part H72 in the pivot plate H' so as not to turn about the central axis. Thus, the rod A3' does not turn in synchronization with the worm wheel A71'.

Next, movements of the actuator A' will be described. A controller not shown or the like controls the motor A6' to rotate in an appropriate direction. Then, rotational force of the motor A6' is transmitted to the worm wheel A71' through the warm A72' so that the worm wheel A71' and the male screw A73' rotate. Since the rod A3' engages with the engaging part H72 in the pivot plate H' so as not to turn, when the male screw A73' rotates, the rod A3' moves back and forth in the axial direction of the male screw A73'. Thus, the pivot plate H' tilts with respect to the actuator A' in an arbitrary direction in accordance with a movement amount of the pair of rods A3' and A3'. More specifically, the pivot plate H' tilts in an arbitrary direction in combination of a tilting movement about the central axis of the cylindrical inner lateral surface of the stopper A83 in synchronization with the first support cap A91 and a tilting movement about the central axis (line which connects the axes 912 and 912) of the first support cap A91.

In the mirror angle controller in such a structure, the rods A3' and A3' in the actuator A' which push and pull the pivot plate H' are also arranged inside the holder 821 which supports the pivot plate H'. Therefore, the load applied to the mirror M (see FIG. 14) is mostly applied to the holder 821. Consequently, even in a case where there is backlash between the rod A3' and the pivot plate H', or a case where the rod A3 itself has a dimension error or a mounting error, it is possible to securely hold the mirror M. Moreover, the ringed sliding part H8 which is formed in the pivot plate H' is always contact with the ringed holder 821 which is formed in the housing A8. Accordingly, neither water nor dust enters between the ringed sliding part H8 and the ringed holder 821. As a result, it is possible to exclude or simplify watertight sealing around the rod A3' which is placed inside the holder 821.

In the embodiment, the housing A8 is also formed in a bowl-shape. In addition, the holder 821 is formed on the rim to make the maximum use of the size of the housing A8. Thus, it is possible to downsize the housing A8 while the holder 821 is large enough to securely hold the pivot plate H'. As a result, it is possible to downsize the mirror angle controller.

In addition, the mirror angle controller includes the stopper A83 which prevents the pivot plate H' from turning. Therefore, rotation force about an axis perpendicular to the mirror surface of the mirror M is applied to the stopper A83. In other words, according to the mirror angle controller, no extra external force is applied to the rod A3'. Accordingly, it is possible to enhance durability of the rod A3'. As a result, it is possible to securely hold the mirror M.

Moreover, in the mirror angle controller, the stopper A83 is also surrounded by the holder 821 in the housing A8. In other words, the stopper A83 is formed inside the housing A8. Therefore, it is possible to effectively use the space inside the housing A1. As a result, it is possible to downsize the mirror angle controller.

While the described embodiments represent the exemplary forms of the present invention, it is to be distinctly understood that the invention is not limited thereto but may be otherwise variously embodied within the spirit and scope of the accompanying claims.

For instance, in the above-described embodiments, the housing formed in a bowl-shape is employed. However, the shape of the housing is not limited to this. Any housing which includes the ringed holder can be employed without limitation in shape. Moreover, any pivot plate which includes a ringed sliding part can be employed without limitation in shape.

In each of the above-described embodiments, the mirror angle controller is described in which the sliding part in the pivot plate is inserted in the holder in the actuator. However, the holder in the actuator may be inserted in the sliding part in the pivot plate. In other words, in the mirror angle controller, the outer peripheral surface of the holder in the actuator may be contact with the inner peripheral surface of the sliding part in the pivot plate.

The invention claimed is:

1. A mirror angle controller comprising:
a pivot plate which is attached to a reverse side of a mirror; and
an actuator which holds the pivot plate,
wherein the actuator comprises a housing, a rod which pushes and pulls the pivot plate, and a motor which provides driving force to the rod,
wherein, a ringed holder is formed along a back side rim of the housing which is placed to completely surround the rod, and an inner peripheral surface of the ringed holder has a plurality of lubricating grooves therein, and
wherein the pivot plate comprises a ringed sliding part which is in contact with and arbitrarily slides on the ringed holder, and an engaging part which is engaged with an end of the rod.

2. The mirror angle controller as claimed in claim 1,
wherein the housing further comprises a stopper which prevents the pivot plate from turning in a circumferential direction of the ringed holder, and
wherein the stopper is surrounded by the ringed holder.

3. A mirror angle controller as comprising:
a pivot plate which is attached to a reverse side of a mirror; and
an actuator which holds the pivot plate,
wherein the actuator comprises a housing, a rod which pushes and pulls the pivot plate, and a motor which provides driving force to the rod,
wherein, a ringed holder is formed along a back side rim of the housing which is placed to completely surround the rod, and an inner peripheral surface of the ringed holder has a plurality of lubricating grooves therein,
wherein the pivot plate comprises a ringed sliding part which is in contact with and arbitrarily slides on the ringed holder, and an engaging part which is engaged with an end of the rod,
wherein the housing is formed in a bowl-shape, and
wherein the ringed holder is formed on a rim of the housing.

4. The mirror angle controller as claimed in claim 3,
wherein a motor container in which the motor is placed is formed on the pivot plate side of the housing.

5. The mirror angle controller as claimed in claim 4,
wherein the actuator further comprises a cover which covers the motor container.

6. The mirror angle controller as claimed in claim 5,
wherein the actuator further comprises a stopper which prevents the pivot plate from turning in a circumferential direction of the ringed holder, and
wherein the stopper is formed in the cover.

* * * * *